United States Patent
Kim et al.

(10) Patent No.: US 8,289,998 B2
(45) Date of Patent: Oct. 16, 2012

(54) METHOD AND APPARATUS FOR GENERATING THREE (3)-DIMENSIONAL IMAGE DATA STREAM, AND METHOD AND APPARATUS FOR RECEIVING THREE (3)-DIMENSIONAL IMAGE DATA STREAM

(75) Inventors: Yong-tae Kim, Seoul (KR); Jae-seung Kim, Yongin-si (KR); Moon-seok Jang, Seoul (KR); Jae-jun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 332 days.

(21) Appl. No.: 12/696,708

(22) Filed: Jan. 29, 2010

(65) Prior Publication Data
US 2010/0208750 A1 Aug. 19, 2010

Related U.S. Application Data

(60) Provisional application No. 61/152,310, filed on Feb. 13, 2009.

(30) Foreign Application Priority Data

May 1, 2009 (KR) ........................ 10-2009-0038734

(51) Int. Cl.
*H04J 3/24* (2006.01)
(52) U.S. Cl. .......................... 370/474; 725/54
(58) Field of Classification Search .................. 370/474, 370/475; 348/43; 725/54
See application file for complete search history.

(56) References Cited

U.S. PATENT DOCUMENTS

| | | | | |
|---|---|---|---|---|
| 8,045,588 | B2 * | 10/2011 | Lee et al. | 370/475 |
| 2001/0028744 | A1 * | 10/2001 | Han et al. | 382/232 |
| 2008/0310499 | A1 * | 12/2008 | Kim et al. | 375/240.01 |
| 2009/0041339 | A1 * | 2/2009 | Yamada et al. | 382/154 |
| 2010/0110162 | A1 * | 5/2010 | Yun et al. | 348/42 |
| 2010/0225645 | A1 * | 9/2010 | Suh et al. | 345/419 |
| 2011/0038614 | A1 * | 2/2011 | Chen et al. | 386/341 |

FOREIGN PATENT DOCUMENTS

| | | |
|---|---|---|
| KR | 1020050111379 A | 11/2005 |
| KR | 1020070058302 A | 6/2007 |
| KR | 1020070061227 A | 6/2007 |
| WO | 2005114998 A1 | 12/2005 |
| WO | 2007064159 A1 | 6/2007 |

* cited by examiner

Primary Examiner — Gary Mui
(74) Attorney, Agent, or Firm — Sughrue Mion, PLLC

(57) ABSTRACT

Provided is a method of generating a three-dimensional (3D) image data stream, the method including: generating an elementary stream (ES) including an encoded bit string of a 3D image; generating at least one packetized elementary stream (PES) by packetizing the elementary stream; generating at least one section by multiplexing program related information of the 3D image; generating at least one transport stream (TS) packet for the at least one section and the at least one PES; and generating a TS by multiplexing the generated TS packet, wherein 3D image reproduction information that is required to reproduce the 3D image is inserted into at least one of the at least one PES, the at least one TS packet, and the at least one section.

61 Claims, 28 Drawing Sheets

FIG. 3

| Value | Description |
|---|---|
| 0x00 | Side by side |
| 0x01 | Top and bottom |
| 0x02 | Vertical line interleaved |
| 0x03 | Horizontal line interleaved |
| 0x04 | Checker board |
| 0x05 | Frame sequential |
| 0x06 | Field sequential |
| 0x07 | First view image in multiple stream type |
| 0x08 | Second view image in multiple stream type |
| 0x09 | Depth map |
| 0x0A | 2D image interval in 3D image format |
| 0x0B~0x3F | reserved |

FIG. 4

| Type | LR_indicator = 1 | | LR_indicator = 0 | |
|---|---|---|---|---|
| | Left view | Right view | Left view | Right view |
| Side by side | Left side | Right side | Right side | Left side |
| Top and bottom | Top side | Bottom side | Bottom side | Top side |
| Vertical line interleaved | Odd line | Even line | Even line | Odd line |
| Horizontal line interleaved | Odd line | Even line | Even line | Odd line |
| Checker board | First pel of first line | First pel of second line | First pel of second line | First pel of first line |
| Frame sequential | Odd frame | Even frame | Even frame | Odd frame |
| Field sequential | Top field | Bottom field | Bottom field | Top field |
| Multiple stream type | First view image | Second view image | Second view image | First view image |

FIG. 5

```
         unsigned int(1)    temporal_local_3d_indicator;  —510
520— if(temporal_local_3d_indicator) {
         unsigned int(40)   remaining_3d_pictures;        —530
     }
```

FIG. 6

```
         unsigned int(1)    temporal_local_3d_indicator;  —610
620— if(temporal_local_3d_indicator) {
         unsigned int(4)    reserved;
         unsigned int(3)    DTS_3d_period[32..30];
         unsigned int(1)    marker_bit;
         unsigned int(15)   DTS_3d_period[29..15];         630
         unsigned int(1)    marker_bit;
         unsigned int(15)   DTS_3d_period[14..0];
         unsigned int(1)    marker_bit;
     }
```

FIG. 7

```
         unsigned int(1)    spatial_local_3d_indicator;   —710
720— if(spatial_local_3d_indicator) {
         unsigned int(16)   horizontal_offset;
         unsigned int(16)   vertical_offset;
         unsigned int(16)   local_3d_width;                730
         unsigned int(16)   local_3d_height;
     }
```

```
            unsigned int(1)    imbalance_info_indicator;  ——1110
1120 —— if(imbalance_info_indicator) {
            unsigend int(8)    imbalance_offset;  ——1130
         }
```

FIG. 12

```
         unsigned int(1)    imbalance_info_indicator;  ── 1110
1220 ── if(imbalance_info_indicator) {
         unsigend int(8)    imbalance_offset;    ⎫
         unsigend int(8)    imbalance_scale;     ⎬ 1230
         }                                       ⎭
```

FIG. 13

```
         unsigned int(1)    imbalance_info_indicator;  ──1110
1320 ── if(imbalance_info_indicator) {
         unsigend int(8)    first_value;         ⎫
         unsigend int(2)    increment[255];      ⎬ 1330
         }                                       ⎭
```

FIG. 14

```
unsigned int(6)   3d_format_type;              —1420
unsigned int(1)   LR_indicator;                —1430
unsigned int(1)   Full_Res_indicator;          —1440
unsigned int(1)   spatial_local_3d_indicator;  — 710
unsigned int(1)   temporal_local_3d_indicator; — 510
unsigned int(1)   is_cam_params_changed;       — 810
unsigned int(1)   is_safety_params_changed;    — 910
unsigned int(1)   imbalance_info_indicator;    —1110
unsigned int(3)   reserved;

720 — if(spatial_local_3d_indicator) {
        unsigned int(16)   horizontal_offset;    ⎫
        unsigned int(16)   vertical_offset;      ⎬ 730
        unsigned int(16)   local_3d_width;       ⎪
        unsigned int(16)   local_3d_height;      ⎭
     }
520 — if(temporal_local_3d_indicator) {
        unsigned int(40)   remaining_3d_pictures;  — 530
     }
820 — if(is_cam_params_changed){
        unsigned int(32)   rotation[3];          ⎫
        unsigned int(32)   translation[3];       ⎪
        unsigned int(32)   primary_focal_length; ⎪
        unsigned int(32)   secondary_focal_length;⎪
        unsigned int(32)   aspect_ratio;         ⎬ 830
        unsigned int(16)   primary_principal_point_x; ⎪
        unsigned int(16)   primary_principal_point_y; ⎪
        unsigned int(16)   secondary_principal_point_x;⎪
        unsigned int(16)   secondary_principal_point_y;⎭
     }
920 — if(is_safety_params_changed) {
        unsigned int(16)   expected_display_width;  ⎫
        unsigned int(16)   expected_display_height; ⎪
        unsigned int(16)   expected_viewing_distance;⎬ 930
        int(16)            min_of_disparity;        ⎪
        int(16)            max_of_disparity;        ⎭
     }
1220 — if(imbalance_info_indicator) {
        unsigned int(8)    imbalance_offset;  ⎫ 1230
        unsigned int(8)    imbalance_scale;   ⎭
     }
```

FIG. 16A

| value | Description |
|---|---|
| 0x0000 | PAT |
| 0x0001 | CAT |
| 0x0002 | Transport Stream Description Table |
| 0x0003~0x000F | Reserved |
| 0x0010~0x1FFE | Network PID, Program map PID, Elementary PID, other purposes |
| 0X1FFF | Null Packet |

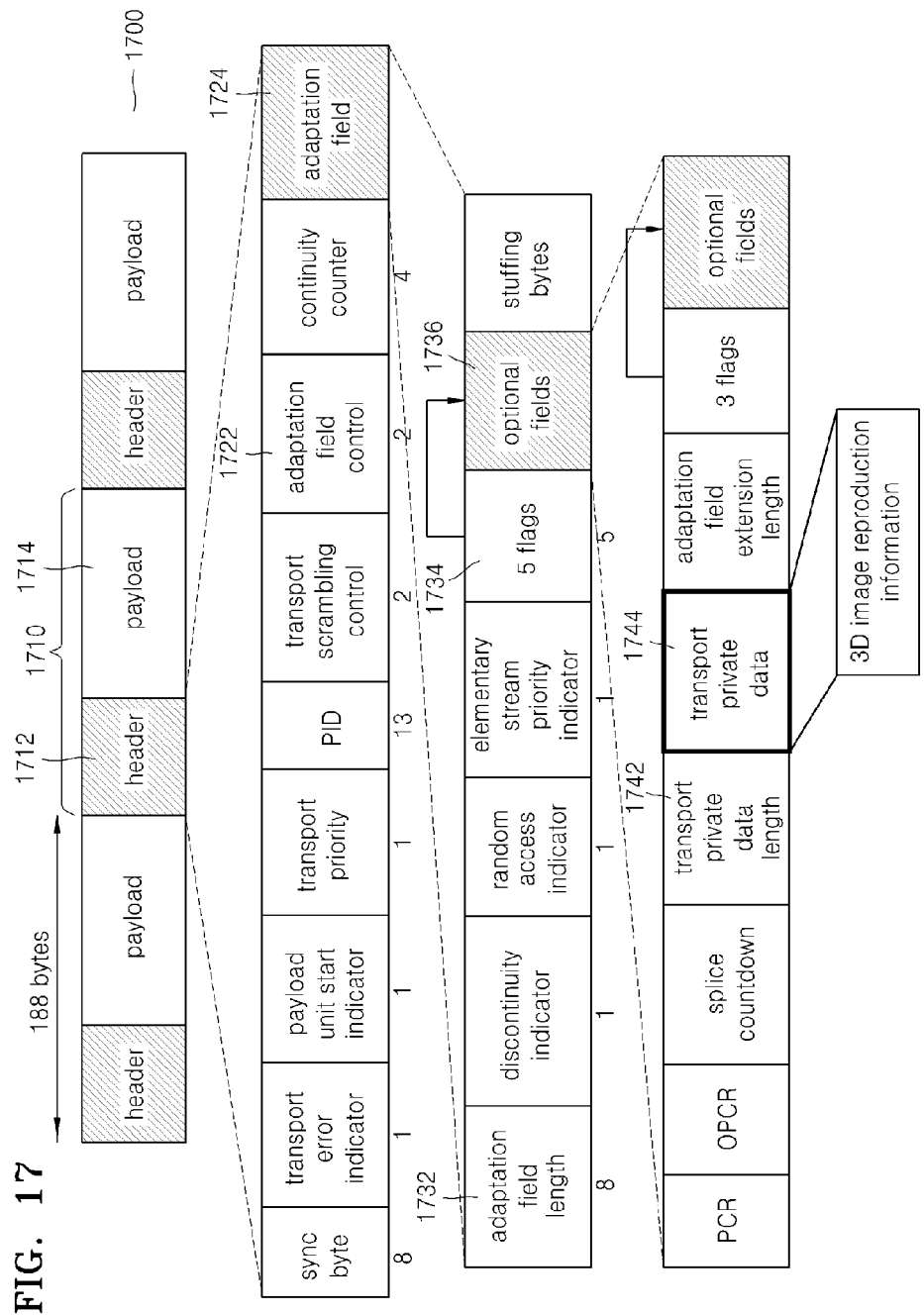

FIG. 18

| threed_info_start_code | 2 |
|---|---|
| 3d_format_type + LR_indicator + Full_Res_indicator | 1 |
| indicators | 1 |
| spatial local 3d | 8 |
| temporal local 3d | 5 |
| camera parameters | 44 |
| safety parameters | 12 |
| imbalance parameters | 65 |
| Total | 138 |

FIG. 19

```
              unsigned int(16)   threed_info_start_code;   — 1910
              unsigned int(6)    3d_format_type;  —1420
              unsigned int(1)    LR_indicator;  — 1430
              unsigned int(1)    Full_Res_indicator;  —1440
              unsigned int(1)    spatial_local_3d_indicator;  — 710
              unsigned int(1)    temporal_local_3d_indicator;  — 510
              unsigned int(1)    is_cam_params_changed;  — 810
              unsigned int(1)    is_safety_params_changed;  — 910
              unsigned int(1)    imbalance_info_indicator;  — 1110
              unsigned int(3)    reserved;
       720— if(spatial_local_3d_indicator) {
              unsigned int(16)   horizontal_offset;    ⎫
              unsigned int(16)   vertical_offset;      ⎬ 730
              unsigned int(16)   local_3d_width;       ⎟
              unsigned int(16)   local_3d_height;      ⎭
              }
       520— if(temporal_local_3d_indicator) {
              unsigned int(40)   remaining_3d_pictures;  —530
              }
       820— if(is_cam_params_changed){
              unsigned int(32)   rotation[3];          ⎫
              unsigned int(32)   translation[3];       ⎟
              unsigned int(32)   primary_focal_length; ⎟
              unsigned int(32)   secondary_focal_length; ⎟
              unsigned int(32)   aspect_ratio;         ⎬ 830
              unsigned int(16)   primary_principal_point_x; ⎟
              unsigned int(16)   primary_principal_point_y; ⎟
              unsigned int(16)   secondary_principal_point_x; ⎟
              unsigned int(16)   secondary_principal_point_y; ⎭
              }
       920— if(is_safety_params_changed) {
              unsigned int(16)   expected_display_width;    ⎫
              unsigned int(16)   expected_display_height;   ⎟
              unsigned int(16)   expected_viewing_distance; ⎬ 930
              int(16)            min_of_disparity;          ⎟
              int(16)            max_of_disparity;          ⎭
              }
      1920— if(imbalance_info_indicator) {
              unsigend int(8)    first_value;     ⎫
              unsigend int(2)    increment[255];  ⎬ 1930
              unsigend int(2)    reserved;        ⎭
              }
```

FIG. 22

```
        unsigned in(16)    threed_info_start_code;  — 1910
        unsigned int(6)    3d_format_type;  — 1420
        unsigned int(1)    LR_indicator;  — 1430
        unsigned int(1)    Full_Res_indicator;  — 1440
        unsigned int(1)    spatial_local_3d_indicator;  — 710
        unsigned int(1)    temporal_local_3d_indicator;  — 610
        unsigned int(6)    reserved;
720 — if(spatial_local_3d_indicator) {
        unsigned int(16)   horizontal_offset;  ⎫
        unsigned int(16)   vertical_offset;    ⎬ 730
        unsigned int(16)   local_3d_width;     ⎪
        unsigned int(16)   local_3d_height;    ⎭
        }
620 — if(temporal_local_3d_indicator) {
        unsigned int(32)   remaining_3d_pictures;  — 630
        }
```

FIG. 23

```
            unsigned int(16)   threed_info_start_code;    — 1910
            unsigned int(1)    is_cam_params_changed;     — 810
            unsigned int(1)    is_safety_params_changed;  — 910
            unsigned int(1)    imbalance_info_indicator;  — 1110
            unsigned int(5)    reserved;
820 ——  if(is_cam_params_changed){
            unsigned int(32)   rotation[3];                          ⎫
            unsigned int(32)   translation[3];                       ⎪
            unsigned int(32)   primary_focal_length;                 ⎪
            unsigned int(32)   secondary_focal_length;               ⎬ 830
            unsigned int(32)   aspect_ratio;                         ⎪
            unsigned int(16)   primary_principal_point_x;            ⎪
            unsigned int(16)   primary_principal_point_y;            ⎪
            unsigned int(16)   secondary_principal_point_x;          ⎪
            unsigned int(16)   secondary_principal_point_y;          ⎭
        }
        if(is_safety_params_changed) {
            unsigned int(16)   expected_display_width;               ⎫
            unsigned int(16)   expected_display_height;              ⎪
            unsigned int(16)   expected_viewing_distance;            ⎬ 930
            int(16)            min_of_disparity;                     ⎪
            int(16)            max_of_disparity;                     ⎭
        }
1220 —— if(imbalance_info_indicator) {
            unsigned int(8)    imbalance_offset                      ⎫
            unsigned int(8)    imbalance_scale;                      ⎬ 1230
        }                                                            ⎭
```

FIG. 25

|  | 3d_format_category == 0 | 3d_format_category == 1 |
|---|---|---|
| 0000 | Side by side | Primary view in multiple ESes type |
| 0001 | Top and bottom | Reserved |
| 0010 | Vertical line interleaved | Reserved |
| 0011 | Horizontal line interleaved | Reserved |
| 0100 | Checker board | Reserved |
| 0101 | Frame sequential | Reserved |
| 0110 | Field sequential | Reserved |
| 0111 | 2D video | 2D video |
| 1000 | Reserved | Secondary view in multiple ESes type |
| 0111~1111 | Reserved | Reserved |

FIG. 27

| Syntax | No. of bits |
|---|---|
| 2700 — 3d_start_descriptor(){ | |
| 2710 — descriptor_tag | 8 |
| 2720 — descriptor_length | 8 |
| 2730 — threed_info_start_code | 32 |
| } | |

FIG. 28

| Syntax | No. of bits |
|---|---|
| 2800 — 3d_camera_descriptor(){ | |
| 2710 — descriptor_tag | 8 |
| 2720 — descriptor_length | 8 |
| rotation[3] | 32*3 |
| translation[3] | 32*3 |
| primary_focal_length | 32 |
| secondary_focal_length | 32 |
| aspect_ratio | 32 |
| primary_principal_point_x | 16 |
| primary_principal_point_y | 16 |
| secondary_principal_point_x | 16 |
| secondary_principal_point_y | 16 |
| } | |

(rows rotation[3] through secondary_principal_point_y grouped as 2810)

FIG. 29

| Syntax | No. of bits |
|---|---|
| 3d_safety_descriptor(){ | |
| descriptor_tag | 8 |
| descriptor_length | 8 |
| expected_display_width | 16 |
| expected_display_height | 16 |
| expected_viewing_distance | 16 |
| min_of_disparity | 16 |
| max_of_disparity | 16 |
| } | |

FIG. 30

| Syntax | No. of bits |
|---|---|
| local_3d_descriptor(){ | |
| descriptor_tag | 8 |
| descriptor_length | 8 |
| horizontal_offset | 16 |
| vertical_offset | 16 |
| local_3d_width | 16 |
| local_3d_height | 16 |
| remaining_3d_pictures | 32 |
| } | |

| Syntax | No. of bits |
|---|---|
| 3100 — imbalance_descriptor(){ | |
| 2710 — descriptor_tag | 8 |
| 2720 — descriptor_length | 8 |
| 3110 { imbalance_offset | 8 |
| imbalance scale | 8 |
| } | |

# METHOD AND APPARATUS FOR GENERATING THREE (3)-DIMENSIONAL IMAGE DATA STREAM, AND METHOD AND APPARATUS FOR RECEIVING THREE (3)-DIMENSIONAL IMAGE DATA STREAM

CROSS-REFERENCE TO RELATED PATENT APPLICATION

This application claims priority from U.S. Provisional Patent Application No. 61/152,310, filed on Feb. 13, 2009, in the U.S. Patent and Trademark Office and Korean Patent Application No. 10-2009-0038734, filed on May 1, 2009, in the Korean Intellectual Property Office, the disclosures of which are incorporated herein in its entirety by reference.

BACKGROUND OF THE INVENTION

1. Field of the Invention

Methods and apparatuses consistent with the present invention relate to transmitting and receiving three (3)-dimensional (3D) image data stream, and more particularly, to transmitting and receiving detailed information for reproducing a 3D image.

2. Description of the Related Art

In order for a two (2)-dimensional (2D) image reproducing device to reproduce a 3D image while maintaining a 3D effect, additional information showing characteristics of the 3D image is required. A transmitting terminal providing an image service may transmit encoded data of a 3D image, and may transmit additional information about the 3D image via an additional channel. A receiving terminal receiving the image service may receive the encoded data and the additional information via at least two channels.

In order not to occupy an additional channel, the additional information may be provided in a form of metadata added to existing data, via the same channel as the encoded data.

SUMMARY OF THE INVENTION

The present invention provides a transport stream system for efficiently transmitting and receiving information required in reproducing a 3D image.

According to an aspect of the present invention, there is provided a method of generating a 3D image data stream, the method including: generating an elementary stream (ES) comprising an encoded bit string of a 3D image; generating at least one PES by packetizing the ES; generating at least one section by multiplexing program related information about the 3D image; generating at least one transport stream (TS) packet for the at least one section and the at least one PES; and generating a TS by multiplexing the generated TS packet, wherein 3D image reproduction information that is required to reproduce the 3D image is inserted into any one of the at least one PES, the at least one TS packet, and the at least one section.

The method may further include transmitting the TS.

The method may further include storing the TS.

The 3D image reproduction information may be stored in an established area in at least one of the at least one PES, the at least one TS packet, and the at least one section.

The generating the TS packet may include inserting the 3D image reproduction information into an adaptation field of a predetermined TS packet from among the at least one TS packet. In the inserting the 3D image reproduction information, the 3D image reproduction information may be inserted into a private data byte area of the adaptation field area.

Indicator information, which indicates whether the 3D image reproduction information is defined, may be inserted into a reserved area of an adaptation field extension area of the adaptation field area. In the inserting the 3D image reproduction information, the 3D image reproduction information may be inserted into a reserved area of an adaptation field extension area of the adaptation field area.

The generating the PES may include inserting the 3D image reproduction information into an extension field area of a predetermined PES from among the at least one PES. In the inserting the 3D image reproduction information, the 3D image reproduction information may be inserted into at least one of a private data area of the extension field area and another data area of the extension field area.

Information indicating starting of the 3D image reproduction information, 3D image format information, left and right arrangement information, full resolution information, temporal interval 3D reproduction information, and spatial interval 3D reproduction information from among the 3D image reproduction information may be inserted into the private data area, and remaining information from among the 3D image reproduction information may be inserted into the other data area of the extension field area.

The generating the TS packet may include inserting the 3D image reproduction information into a program map table (PMT) section from among at least one section. In the inserting the 3D image reproduction information, left and right arrangement information from among 3D image reproduction information may be inserted into a reserved area of a stream type information area of the PMT section, and 3D image format information from among the 3D image reproduction information may be inserted into a reserved area of an elementary packet identifier (PID) information area of the PMT section. In the inserting the 3D image reproduction information, information excluding the 3D image format information, the left and right arrangement information, and the full resolution information from among the 3D image reproduction information may be inserted into a loop descriptor area of the program map table section.

In the inserting the 3D image reproduction information, full resolution information, which indicates resolution of a right view image and a left view image forming the 3D image, from among the 3D image reproduction information may be inserted into the reserved area of the stream type information area.

The 3D image format information may be classified based on whether the 3D image has a format according to a plurality of ESs.

The generating the TS packet may include: generating a private section from among the at least one section; and inserting the 3D image reproduction information into the private section. In the inserting the 3D image reproduction information, the 3D image reproduction information may be inserted into a private data byte area of the private section.

The generating the TS packet may include: generating at least one 3D reproduction descriptor comprising the 3D image reproduction information; and inserting the at least one 3D reproduction descriptor into a descriptor area of a PMT section.

The 3D reproduction descriptor may include a 3D information start descriptor indicating that the 3D reproduction descriptor exists. The 3D reproduction descriptor may include at least one of a 3D camera descriptor, a low fatigue descriptor, an interval 3D reproduction descriptor, and a left and right imbalance descriptor.

The 3D image reproduction information may include 3D start information indicating starting of the 3D image reproduction information.

The 3D image reproduction information may include essential information comprising 3D image format information, which indicates formats of a left view image and a right view image of the 3D image, left and right arrangement information, which indicates an arrangement order of the left view image and the right view image, and full resolution information, which indicates resolution of the left view image and the right view image forming the 3D image.

The 3D image reproduction information may further include additional information, which is required for smooth reproduction of the 3D image.

The additional information may include at least one of interval 3D reproduction information that indicates temporal interval or spatial interval that is reproduced in 3D from among entire image data, 3D camera information that is about cameras that obtained the 3D image, low fatigue information that lessens viewing awkwardness generated while reproducing the 3D image, and left and right imbalance information that indicates an imbalance state of the left view image and the right view image.

The left and right imbalance information may be expressed by using one of an offset between a left view image pixel value and a right view image pixel value, a linear function between the left view image pixel value and the right view image pixel value, and a look-up table between the left view image pixel value and the right view image pixel value.

The additional information may include indicator information that indicates whether the additional information is defined.

According to another aspect of the present invention, there is provided a method of receiving 3D image data stream, the method including: separating at least one TS packet by demultiplexing a received TS; restoring at least one PES and at least one section by depacketizing the at least one TS packet; restoring an ES by depacketizing the at least one PES; extracting 3D image reproduction information that is required to reproduce a 3D image from the at least one TS packet, the at least one PES, and the at least one section; and restoring the 3D image by decoding data of the ES.

The method may further include reproducing the restored 3D image by using the 3D image reproduction information.

The extracting the 3D image reproduction information may include extracting the 3D image reproduction information from an established area in at least one of the at least one PES, the at least one TS packet, and the at least one section.

The extracting the 3D image reproduction information may include extracting the 3D image reproduction information from an adaptation field area of a predetermined TS packet from among at least one TS packet. The extracting the 3D image reproduction information may include extracting the 3D image reproduction information from a private data byte area of the adaptation field area.

In the extracting the 3D image reproduction information, indicator information, which indicates whether the 3D image reproduction information is defined, from among the 3D image reproduction information may be extracted from a reserved area of an adaptation field extension area of the adaptation field area. In the extracting the 3D image reproduction information, the 3D image reproduction information may be extracted from a reserved area of an adaptation field extension area of the adaptation field area.

The extracting the 3D image reproduction information may include extracting the 3D image reproduction information from an extension field of a predetermined PES from among the at least one PES. In the extracting the 3D image reproduction information, the 3D image reproduction information may be extracted from at least one of a private data area of the extension field area and another data area of the extension field area.

Information indicating starting of the 3D image reproduction information, 3D image format information, left and right arrangement information, full resolution information, temporal interval 3D reproduction information, and spatial interval 3D reproduction information from among the 3D image reproduction information may be extracted from the second reserved area of the private data area, and remaining information from among the 3D image reproduction information may be extracted from the other data area of the extension field area.

The extracting the 3D image reproduction information may include extracting the 3D image reproduction information from a PMT from among the at least one section. In the extracting the 3D image reproduction information, left and right arrangement information from among the 3D image reproduction information may be extracted from a reserved area of a stream type information area of the program map table section, and 3D image format information from among the 3D image reproduction information may be extracted from a fifth reserved area of an elementary PID information area of the PMT section. In the extracting the 3D image reproduction information, full resolution information, which indicates resolution of a left view image and a right view image forming the 3D image, from among the 3D image reproduction information may be extracted from the reserved area of the stream type information area.

In the extracting of the 3D image reproduction information, information excluding the 3D image format information, the left and right arrangement information, and the full resolution information from among the 3D image reproduction information may be extracted from a loop descriptor area of the PMT section.

The extracting the 3D image reproduction information may include extracting the 3D image reproduction information from a private section from among the at least one section. In the extracting the 3D image reproduction information, the 3D image reproduction information may be extracted from a private data byte area of the private section.

The extracting the 3D image reproduction information may include extracting at least one 3D reproduction descriptor including the 3D image reproduction information, from a descriptor area of a PMT section.

In the extracting the 3D image reproduction information, 3D start information, which indicates starting of the 3D image reproduction information, may be extracted from the 3D image reproduction information, and the 3D image reproduction information may be extracted based on the 3D start information.

According to another aspect of the present invention, there is provided an apparatus for generating a 3D image data stream, the apparatus including: an ES generator which generates an ES comprising an encoded bit string of a 3D image; a PES generator which generates at least one PES by packetizing the ES; a section generator which generates at least one section by multiplexing program related information of the 3D image; a TS packet generator which generates at least one TS packet for the at least one section and at least one PES; and a TS generator which generates a TS by multiplexing the generated TS packet, wherein 3D image reproduction information, which is required to reproduce the 3D image, is inserted into any one of the at least one PES, the at least one TS packet, and the at least one section.

The apparatus may further include a TS transmitter which transmits the TS. The TS may be stored in a storage medium.

According to another aspect of the present invention, there is provided an apparatus for receiving a 3D image data stream, the apparatus including: a TS demultiplexer which separates at least one transport packet by demultiplexing a received TS; a TS packet depacketizer which restores at least one PES and at least one section by depacketizing the at least one TS packet; a PES depacketizer which restores an ES by depacketizing the at least one PES; a 3D image reproduction information extractor which extracts 3D image reproduction information required to reproduce a 3D image, from any one of the at least one TS packet, the at least one PES, and at least one section; and a 3D image restorer which restores the 3D image by decoding data of the ES.

The apparatus may further include a 3D image reproducer which reproduces the restored 3D image by using the 3D image reproduction information.

According to another aspect of the present invention, there is provided a computer readable recording medium having recorded thereon a program for executing the method of generating 3D image data stream.

According to another aspect of the present invention, there is provided a computer readable recording medium having recorded thereon a program for executing the method of receiving 3D image data stream.

BRIEF DESCRIPTION OF THE DRAWINGS

The above and other aspects of the present invention will become more apparent by describing in detail exemplary embodiments thereof with reference to the attached drawings, in which:

FIG. 3 is a table showing 3D image format information according to an exemplary embodiment;

FIG. 4 is a table showing left and right arrangement information according to an exemplary embodiment;

FIG. 5 illustrates temporal interval 3D reproduction information according to an exemplary embodiment;

FIG. 6 illustrates temporal interval 3D reproduction information according to an exemplary embodiment;

FIG. 7 illustrates spatial interval 3D reproduction information according to an exemplary embodiment;

FIG. 12 illustrates left and right imbalance information according to an exemplary embodiment;

FIG. 13 illustrates left and right imbalance information according to an exemplary embodiment;

FIG. 14 illustrates 3D image reproduction information according to an exemplary embodiment;

FIG. 16A illustrates a packet identifier table of a TS header according to an exemplary embodiment;

FIG. 17 is a diagram illustrating a data structure, wherein 3D image reproduction information is inserted into an adaptation field area of a TS packet, according to an exemplary embodiment;

FIG. 18 is a table showing a size of 3D image reproduction information, when left and right imbalance information uses a look up table, according to an exemplary embodiment;

FIG. 19 illustrates 3D image reproduction information inserted into an adaptation field area of a TS packet, according to an exemplary embodiment;

FIG. 22 illustrates 3D image basic information inserted into an extension field area of a PES, according to an exemplary embodiment;

FIG. 23 illustrates 3D image additional information inserted into an extension field area of a PES, according to an exemplary embodiment;

FIG. 25 is a table showing 3D image formats according to 3D image format category information, according to an exemplary embodiment;

FIG. 27 is a table showing a 3D information start descriptor inserted into a descriptor area, according to an exemplary embodiment;

FIG. 28 is a table showing a 3D camera descriptor inserted into a descriptor area, according to an exemplary embodiment;

FIG. 29 is a table showing a low fatigue descriptor inserted into a descriptor area, according to an exemplary embodiment;

FIG. 30 is a table showing an interval 3D descriptor inserted into a descriptor area, according to an exemplary embodiment;

DETAILED DESCRIPTION OF EXEMPLARY EMBODIMENTS

Hereinafter, the present invention will be described more fully with reference to the accompanying drawings, in which exemplary embodiments are shown.

Figure 1:
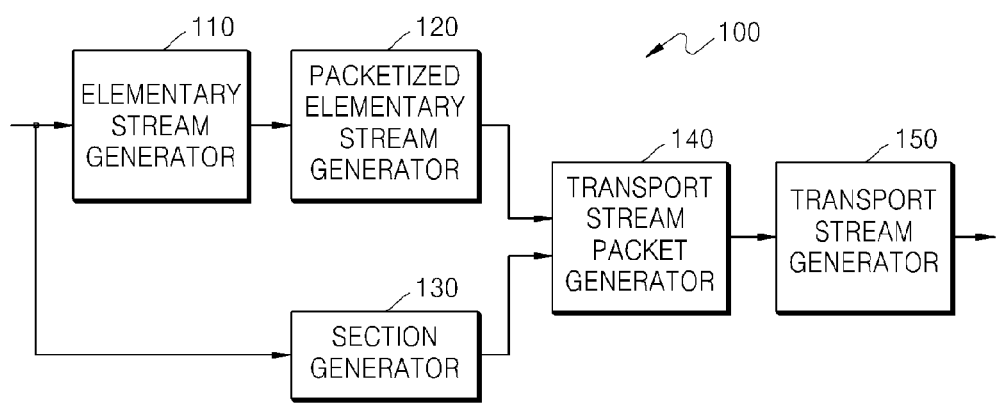
FIG. 1 is a block diagram of an apparatus for generating 3-dimensional (3D) image data stream, according to an exemplary embodiment.

FIG. 1 is a block diagram of an apparatus 100 for generating a three-dimensional (3D) image data stream, according to an exemplary embodiment.

The apparatus 100 according to the current exemplary embodiment includes an elementary stream (ES) generator 110, a packetized elementary stream (PES) generator 120, a section generator 130, a transport stream (TS) packet generator 140, and a TS generator 150.

The ES generator 110 generates an ES including an encoded bit string of multimedia, such as video or audio. Specifically, the ES generator 110 may generate an ES including an encoded bit string of a 3D image.

The PES generator 120 generates at least one PES by receiving and packetizing an ES output from the ES generator 110. The PES may be divided into a PES header area and a PES payload area. At least a part of an ES may be stored in a PES payload area.

The section generator 130 generates at least one section about program related information of a 3D image. A program is a standard unit including a bit string of video and audio. A section is one of data forms that may be transmitted via a TS, and mainly includes program information, such as program association table (PAT), a program map table (PMT), or the like. The section generator 130 may generates a section including program related information of an encoded 3D image.

The TS packet generator 140 generates at least one TS packet with respect to the at least one section generated by the section generator 130 and the at least one PES generated by the packetized ES generator 120.

The TS packet has a fixed length, and starts from a TS header area having four (4) bytes. Data of a section and/or a PES may be inserted into a TS payload area following the TS header area.

The apparatus 100 according to the current exemplary embodiment inserts 3D image reproduction information required to reproduce a 3D image into at least one of a PES, a TS packet, and a section.

The apparatus 100 according to an exemplary embodiment may insert the 3D image reproduction information in an adaptation field area of a TS packet. For example, the 3D image reproduction information may be inserted into a private data byte area of the adaptation field area of the TS packet.

The apparatus 100 according to an exemplary embodiment may insert indicator information, which indicates whether 3D image reproduction information is defined, from among the 3D image reproduction information into a reserved area of an adaptation field extension area of an adaptation field area of a TS packet. The indicator information may include at least one of a temporal interval 3D reproduction information indicator, a spatial interval 3D reproduction information indicator, a 3D camera information indicator, a low fatigue information indicator, and a left and right imbalance information indicator. Alternatively, the entire 3D image reproduction information may be inserted into the reserved area of the adaptation field extension area of the adaptation field area of the TS packet.

The apparatus 100 according to an exemplary embodiment may insert 3D image reproduction information into an extension field area of a PES generated by the PES generator 130. For example, 3D image reproduction information may be inserted into a reserved area of a private data area of an extension field area and a reserved area of the extension field area of the PES.

In the current exemplary embodiment, information indicating starting of 3D image reproduction information, 3D image format information, left and right arrangement information, full resolution information, temporal interval 3D reproduction information, and spatial interval 3D reproduction information from among the 3D image reproduction information may be stored in the reserved area of the private data area of the extension field area of the PES. Also, remaining information from among the 3D image reproduction information may be inserted into the reserved area of the extension field area of the PES.

The apparatus 100 according to an exemplary embodiment may insert 3D image reproduction information in a PMT section from among the at least one section generated by the section generator 130.

For example, left and right arrangement information from among the 3D image reproduction information is inserted into a reserved area of a stream type information area of the PMT section, and 3D image format information from among the 3D image reproduction information may be inserted into a reserved area of an elementary packet identifier (PID) information area of the PMT section. The 3D image format information may be classified based on whether the 3D image has a format according to a plurality of ESs.

Here, full resolution information from among the 3D image reproduction information may be further inserted into the reserved area of the stream type information area of the PMT section. The full resolution information indicates whether resolution of a left view image and resolution of a right view image forming the 3D image are a full resolution or half of the full resolution.

Also, remaining information excluding the 3D image format information, the left and right arrangement information, and the full resolution information from among the 3D image reproduction information may be inserted into a loop descriptor area of the PMT section.

The apparatus 100 according to an exemplary embodiment may insert 3D image reproduction information in a private section by generating the private section as one of the at least one section generated by the section generator 130. For example, the 3D image reproduction information may be inserted into a private data byte area of the private section.

The apparatus 100 according to an exemplary embodiment may use a descriptor area of a PMT section. In other words, in the current exemplary embodiment, at least one 3D reproduction descriptor including the 3D image reproduction information is generated, and the 3D reproduction descriptor is inserted into the descriptor area of a PMT section. Alternatively, the 3D reproduction descriptor may be inserted into a descriptor section from among the at least one section.

The 3D reproduction descriptor may include a 3D information start descriptor indicating that the 3D reproduction descriptor exists. The 3D reproduction descriptor may further include at least one of a 3D camera descriptor, a low fatigue descriptor, an interval 3D reproduction descriptor, and a left and right imbalance descriptor, as information related to reproduction of a 3D image.

In the apparatus 100 according to the above exemplary embodiments, the 3D image reproduction information is inserted into a header or program information of a TS packet, a PES and/or a section, and thus information required to accurately reproduce a 3D image is transmitted.

The TS generator 150 generates a TS by multiplexing the at least one TS packet generated by the TS packet generator 140. The TS is continuation of the at least one TS packet.

The apparatus 100 may further include a transmitter (not shown) that transmits the generated TS. Also, the apparatus 100 may further include a storage unit (not shown) that stores the TS in a storage medium.

The 3D image reproduction information for accurate reproduction of a 3D image may include 3D start information which indicates starting of the 3D image reproduction information. In order to notify a decoding terminal that the 3D image reproduction information needs to be interpreted, the 3D start information may include information indicating that the 3D image reproduction information is contained in a corresponding data stream and the 3D image reproduction information starts from the 3D start information.

Also, 3D image format information, which indicates formats of a left view image and a right view image of a 3D image, left and right arrangement information, which indicates an arrangement order of the left and right view images, and full resolution information may be established as essential information for reproducing the 3D image.

Also, when there is essential information, interval 3D reproduction information, which indicates a temporal interval or a spatial interval reproduced in 3D from among entire image data, 3D camera information, which is about a camera that obtained the 3D image, low fatigue information, which lessens viewing awkwardness that may be generated while reproducing the 3D image, and left and right imbalance information, which indicates an imbalance state of the left and right view images, may be established as additional information for reproducing the 3D image.

The left and right imbalance information may be defined as an offset between a left view image pixel value and a right view image pixel value. Also, the left and right imbalance information may be defined by using a linear function relationship between the left view image pixel value and the right view image pixel value. The left and right imbalance information may be accurately expressed by using a look up table between the left view image pixel value and the right view image pixel value.

Definition of the additional information of the 3D image reproduction information is variable, and thus the additional information may include indicator information that indicates whether the additional information is defined.

Detailed characteristics of the 3D image reproduction information will now be described with reference to accompanying drawings. In other words, 3D image format information of FIG. 3, left and right arrangement information of FIG. 4, temporal interval 3D reproduction information of FIGS. 5 and 6, spatial interval 3D reproduction information of FIG. 7, 3D camera information of FIG. 8, low fatigue information of FIG. 9, and left and right imbalance information of FIG. 11 are described as the 3D image reproduction information.

In a TS system following a predetermined image communication standard, 3D image reproduction information may be inserted into a space pre-assigned in a PES, a TS packet, or a section. Accordingly, the apparatus 100 may be applied to a TS system following an existing image communication standard without changing the TS system. Also, since the pre-assigned space is used, an additional channel or an additional storage space is not required.

Figure 2:
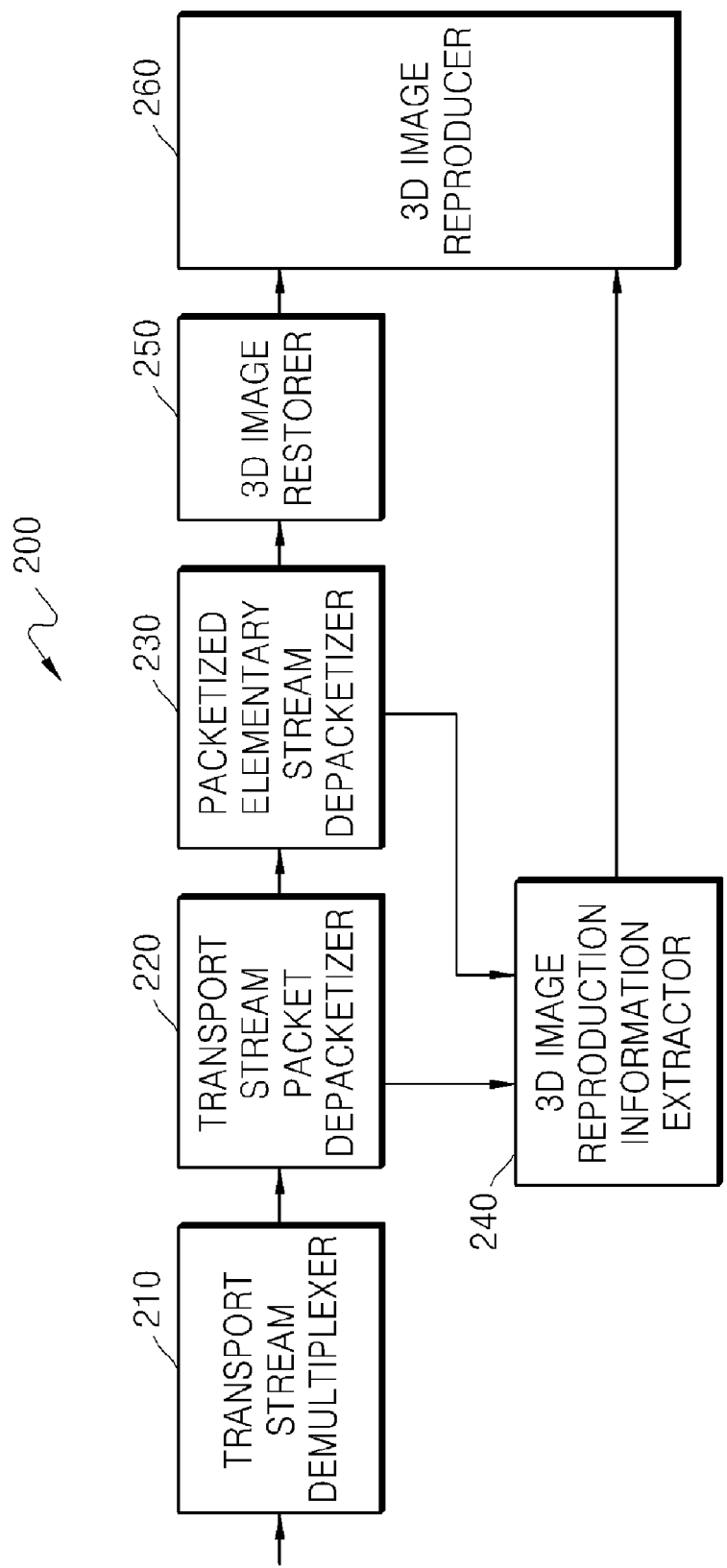
FIG. 2 is a block diagram of an apparatus for receiving 3D image data stream, according to an exemplary embodiment.

FIG. 2 is a block diagram of an apparatus 200 for receiving a 3D image data stream, according to an exemplary embodiment.

The apparatus 200 according to the current exemplary embodiment includes a TS demultiplexer 210, a TS packet depacketizer 220, a PES depacketizer 230, a 3D image reproduction information extractor 240, a 3D image restorer 250, and a 3D image reproducer 260.

The TS demultiplexer 210 separates at least one TS packet by demultiplexing a TS received by the apparatus 200. The TS may be divided into TS packets having a fixed length.

The TS packet depacketizer 220 restores at least one PES and at least one section by depacketizing the at least one TS packet separated by the TS demultiplexer 210.

A packet identifier (PID), which is identification information indicating a type of data transmitted by the TS packet, is recorded in a header area of the TS packet. Program list information is contained in a PAT, and a PID of a TS packet transmitting the PAT is set to be 0.

When the TS is received, a PAT is obtained by searching for a TS packet having a PID that is set to 0, and the PID of the TS packet transmitting a PMT is extracted by analyzing the PAT.

Since the PMT contains information related to each program, a PID of a TS packet containing a bit string forming a program is determined by analyzing the PMT. Accordingly, a TS containing a desired program, such as audio or video, may be accessed.

The PES depacketizer 230 restores an ES by depacketizing the at least one PES restored by the TS packet depacketizer 220. The ES may be a program, such as audio or video. Specifically, the ES restored by the PES depacketizer 230 may include encoded data of a 3D image.

The 3D image reproduction information extractor 240 extracts 3D image reproduction information from at least one of a TS packet, a PES, and a section, which are demultiplexed and restored.

The 3D image reproduction information extractor 240 may extract the 3D image reproduction information from a header or program information in a TS packet, a PES and/or a section.

In the apparatus 200 according to an exemplary embodiment, the 3D image reproduction information extractor 240 may extract 3D image reproduction information from an adaptation field area of a TS packet. For example, the 3D image reproduction information may be extracted from a private data byte area of an adaptation field area of a TS.

In the apparatus 200 according to an exemplary embodiment, the 3D image reproduction information extractor 240 may extract indicator information, which indicates whether 3D image reproduction information is defined, from a reserved area of an adaptation field extension area of an adaptation field area of a TS packet. Alternatively, entire 3D image reproduction information may be extracted from the reserved area of an adaptation field extension area.

In the apparatus 200 according to an exemplary embodiment, the 3D image reproduction information extractor 240 may extract 3D image reproduction information from a reserved area of a private data area of an extension field area of a PES (restored by the TS packet depacketizer 220) and a reserved area of the extension field area of the PES. For example, information indicating starting of 3D image reproduction information, 3D image format information, left and right arrangement information, full resolution information, temporal interval 3D reproduction information, and spatial interval 3D reproduction information from among the 3D image reproduction information are extracted from the reserved area of the private data area of the extension field area of the PES, and the remaining information of the 3D image reproduction information is extracted form the reserved area of the extension field area of the PES.

In the apparatus 200 according to an exemplary embodiment, the 3D image reproduction information extractor 240 may extract left and right arrangement information from a reserved area of a stream type information area of a PMT section from among the at least one section restored by the TS packet depacketizer 220, and extract the 3D image format information from a reserved area of an elementary PID information area of the PMT section. Here, full resolution information from among 3D image reproduction information may be extracted from the reserved area of the stream type information area of the PMT section. Also, remaining information excluding the 3D image format information, the left and right arrangement information, and the full resolution information may be extracted from a loop descriptor area of the PMT section.

In the apparatus 200 according to an exemplary embodiment, the 3D image reproduction information extractor 240 may extract 3D image reproduction information from a private data byte area of a private section.

In the apparatus 200 according to an exemplary embodiment, the 3D image reproduction information extractor 240 may extract a 3D reproduction descriptor from a descriptor area of a PMT section. The 3D reproduction descriptor may include a 3D information start descriptor indicating that the 3D reproduction descriptor exists. Also, the 3D reproduction descriptor may further include at least one of a 3D camera descriptor, a low fatigue descriptor, an interval 3D reproduction descriptor, and a left and right imbalance descriptor, as information related to reproduction of a 3D image.

The 3D image reproduction information extracted and used by the apparatus 200 may correspond to the 3D image reproduction information described with reference to the apparatus 100 as shown in FIG. 1.

Accordingly, the 3D image reproduction information extractor 240 may extract 3D image format information, left and right arrangement information, full resolution information, temporal interval 3D reproduction information, spatial interval 3D reproduction information, 3D camera information, low fatigue information, and left and right imbalance information, as 3D image reproduction information.

The 3D image restorer 250 restores a 3D image by decoding data of an ES. A left view image and a right view image may be separately restored, according to a 3D image format. Alternatively, a left view image and a right view image for a 3D image interval and a 2D image for a 2D image interval may be restored to be mixed in an image sequence.

The 3D image reproducer 260 reproduces the 3D image restored by the 3D image restorer 250 in a 3D reproduction method, by using the 3D image reproduction information.

Since the apparatus 200 extracts 3D image reproduction information that is recognizable by a 3D reproduction system, a 3D content broadcasting service having low fatigue caused by viewing a 3D image may be provided, while maintaining a 3D effect of the 3D image. Also, since the 3D image data stream, which is restored into the 3D content broadcasting service by the apparatus 200, still has a data structure used in a related art 2D image system, the apparatus 200 may be compatible with related art systems. Moreover, since an additional channel, an additional data stream, or an additional storage space is not required so as to receive 3D image reproduction information, the apparatus 200 may be used even in a limited environment.

The apparatus 100 and the apparatus 200 described above may be used in a 3D broadcasting system, a 3D digital television (TV) system, a 3D package media system, or a 3D image decoder in a computer. Accordingly, a 3D digital broadcast providing 2D contents and 3D contents while maintaining compatibleness with a related art digital broadcasting system may be provided.

The above exemplary embodiments are used in a TS-based transmission system and a TS-based receiving system, but the exemplary embodiments where 3D image reproduction information is inserted in a PES may be used in a program stream-based system.

FIG. 3 is a table showing 3D image format information according to an exemplary embodiment.

In order to reproduce a 3D image while maintaining a 3D effect, both of a left view image and a right view image are required. A 3D image format is an image format for including both of left view image information and right view image information, and may be a 3D composite format, a 3D sequential format, or a multiple stream format.

A 3D composite format is an image format in which a left view image and a right view image are arranged in one picture. According to the 3D composite format, a 3D image reproduction system may be realized by decoding, restoring, and then rendering a 3D image while using a related art encoding and decoding system.

Since both of the left view image and the right view image are arranged in one picture in the 3D composite format, each of the left and right view images has a lower resolution than a general 2D image. However, when a frame rate of a related art reproduction system is maintained at a predetermined rate or above, most 3D images are reproduced without quality deterioration in the related art reproduction system. The 3D composite format is a most widely used 3D image format, since the 3D composite format can use a related art reproduction system.

A 3D sequential format is a format in which a left view image and a right view image are arranged in a time axis direction. The 3D sequential format includes a frame sequential format in which a left view frame and a right view frame are continuously and alternatively arranged, and a field sequential format in which a left view field and a right view field are continuously and alternatively arranged. The frame sequential format is hardly used when a frame rate is equal to or lower than a predetermined frequency, since each frame rate of the left view frame and the right view frame decreases by half, and the field sequential format is widely used.

A multiple stream format is an image format in which each of left and right view images forming a 3D image is transmitted and/or received in an individual stream. The multiple stream format requires a plurality of decoders, but is compatible with a related art system. Also, an image may be generated in a full resolution. Since left/right view images or multi view images are each stored in a stream unit, the multiple stream format requires wider bandwidth of a transmission system than a 3D composite format and a 3D sequential format.

The table of FIG. 3 shows values of 3D image format information that can be used by the apparatus 100 and apparatus 200. Hereinafter, in the apparatuses 100 and 200, 3D image format information may be referred to as a variable name called "3d_format_type".

3D image format information may include information about a side by side format, a top and bottom format, a vertical line interleaved format, a horizontal line interleaved format, a checker board format, a frame sequential format, a field sequential format, a first view image in a multiple stream type format, a second view image in the multiple stream type format, a depth map format, and a 2D image interval in 3D image format.

In a side by side format, a left view image and a right view image are respectively arranged on the left and right of one picture. In a top and bottom format, a left view image and a right view image are respectively arranged on the top and bottom of one picture.

In a vertical line interleaved format, a line of a left view image and a line of a right view image are alternatively arranged according to each line in a vertical direction of one picture. In a horizontal line interleaved format, a line of a left view image and a line of a right view image are alternatively arranged according to each line in a horizontal direction of one picture. In a checker board format, a pel of a left view image and a pel of a right view image are alternatively arranged according to both of horizontal and vertical directions of each pel of one picture.

When a first view image and a second view image are inserted into an individual stream, a first view image in a multiple stream type format only includes the first view image, and a second view image in a multiple stream type format only includes the second view image.

In a depth map format, a map including depth difference information between left and right view images, and one of the left and right view images are transmitted and/or received.

A 2D image interval in 3D image format is an image format including a 2D image interval in an image in which a 3D image interval and a 2D image interval are mixed.

The '3d_format_type' is an unsigned int variable having seven (7) bytes, and has a value from 0x00 to 0x7F. According to an exemplary embodiment, 0x00 to 0x0A of '3d_format_type' respectively correspond to the side by side format, the top and bottom format, the vertical line interleaved format, the horizontal line interleaved format, the checker board format, the frame sequential format, the field sequential format, the first view image in a multiple stream type format, the second view image in a multiple stream type format, the depth map format, and the 2D image interval in 3D image format, thereby defining 3D image format information.

A remaining value of '3d_format_type' may be set as a reserved bit for a content added later.

FIG. 4 is a table showing left and right arrangement information according to an exemplary embodiment.

When a 3D image is reproduced with a left view image and a right view image being reversed, fatigue generated while viewing the 3D image may be increased. Accordingly, when a 3D image format includes both of the left and right view images, the left and right view images need to be distinguished from each other. Left and right arrangement information indicates whether different view images included in a 3D image format are a left view image or a right view image, and may be defined with the 3D image format.

The table of FIG. 4 shows an arrangement order of a left view image and a right view image in a 3D image format (type) according to left and right arrangement information. In the apparatuses 100 and 200, left and right arrangement information may be referred to as a variable name called "LR_indicator". When the left and right arrangement information is 1 ('LR_indicator=1'), a left view image and a right view image are respectively arranged on a left side and a right side of a side by side format.

Similarly, when the left and right arrangement information is 1 ('LR_indicator=1'), the left and right view images may be respectively arranged on a top side and a bottom side of a top and bottom format, on an odd line and an even line in a vertical line interleaved format, on an odd line and an even line in a horizontal line interleaved format, on a first pel in a first line and a first pel in a second line in a checker board format, on an odd frame and an even frame in a frame sequential format, on a top field and a bottom field in a field sequential format, and a first view image and a second view image in a multiple stream type format.

When the left and right arrangement information is 0 ('LR_indicator=0'), the left and right view images may be arranged on opposite sides of the above. Only a left view image and a right view image exist in a stereo image in a multiple stream type format that is applicable to a multi view image, and thus, the left and right arrangement information defined in FIG. 4 may be effective.

In the side by side format, the top and bottom format, the vertical line interleaved format, the horizontal line interleaved format, and the checker board format, a left view image and a right view image are simultaneously arranged in one frame. Here, the resolution of each of the left and right view images is reduced to half, and thus the left and right view images may merge into one 3D image frame.

However, in a multimedia reproduction environment supporting a general resolution, the left and right view images may merge into one frame while maintaining the resolution of the left and right view images, thereby generating a 3D image having doubled resolution of each of the left and right view images.

Accordingly, in a 3D image format where a left view image and a right view image are merged into one frame, it is necessary to determine whether a 3D image has a doubled resolution as the left and right view images are merged while maintaining a full resolution, or has a full resolution as the left and right images are merged while each image having a halved resolution.

Accordingly, in the apparatuses 100 and 200, full resolution information, which indicates whether a left view image and a right view image are merged into a 3D image having a doubled resolution, is used. The full resolution information may be referred to as a variable name called "Full_Res_indicator".

The apparatus 200 may obtain full resolution information by parsing a stream. A 3D image restored by decoding a received data stream may be reproduced in 3D by being converted into a 3D image format suitable to a 3D reproduction apparatus by using the full resolution information.

A 2D image interval in 3D image format, from among the 3D image formats shown in the table of FIG. 3, will now be described with reference to FIGS. 5 through 7. Since the 2D image interval in 3D image format is partially reproduced in 3D, an 'interval 3D image', i.e. an interval that is to be recognized as a 3D image needs to be defined. The interval 3D image may be divided into a temporal interval 3D image and a spatial interval 3D image.

Temporal interval 3D image information may be expressed in a relative time or an absolute time. Such an expressing method may be determined based on a system environment or a system specification.

Exemplary embodiments of temporal interval 3D reproduction information will be described with reference to FIGS. 5 and 6, and an exemplary embodiment of spatial interval 3D reproduction information will be described with reference to FIG. 7. Since the temporal interval 3D reproduction information and the spatial interval 3D reproduction information require large number of bits, it is determined whether the temporal interval 3D reproduction information and the spatial interval 3D reproduction information are defined by using an indicator. Accordingly, when an indicator is set to 0, interval 3D reproduction information is not defined.

FIG. 5 illustrates temporal interval 3D reproduction information according to an exemplary embodiment.

The temporal interval 3D reproduction information may be expressed in a number of pictures of a 3D image to be reproduced in 3D. In the apparatuses 100 and 200, an indicator indicating whether the temporal interval 3D reproduction information is defined may be referred to as a variable called 'temporal_local_3d_indicator'.

In other words, when 'temporal_local_3d_indicator' is proclaimed in an unsigned int type (syntax 510) and 'temporal_local_3d_indicator' has a value of 1 (syntax 520), the number of pictures of the interval 3D image may be defined by a variable called 'remaining_3d_pictures', as the temporal interval 3D reproduction information (syntax 530). According to an exemplary embodiment, when all bits of 'remaining_3d_pictures' are 1, a 3D reproduction mode may be maintained until a corresponding image sequence is completed.

FIG. 6 illustrates temporal interval 3D reproduction information according to an exemplary embodiment.

According to the current exemplary embodiment, a reproduction time of an interval 3D image to be reproduced in 3D may be defined. When 'temporal_local_3d_indicator' is proclaimed in an unsigned int type (syntax 610), and 'temporal_local_3d_indicator' has a value of 1 (syntax 620), the reproduction time may be defined by 'DTS_3d_period[ ]' indicating a reproduction time of the interval 3D image, as the temporal interval 3D reproduction information (syntax 630).

A number in [ ] of 'DTS_3d_period[ ]' shows the reproduction time, and may be a relative time or an absolute time. When a 3D reproduction interval and a 2D reproduction interval alternatively exist and 3D reproduction intervals are separated from each other, 'DTS_3d_period[ ]' may be defined in a plural number. Also, 'marker_bit' may be defined so as to indicate a space between the 3D reproduction intervals that are temporally separated from each other.

FIG. 7 illustrates spatial interval 3D reproduction information according to an exemplary embodiment.

The spatial interval 3D reproduction information indicates a location of a spatial interval 3D area to be reproduced in 3D, in one frame including both of a 2D image and a 3D image. The location of the spatial interval 3D area may be indicated by a coordinate of an upper left corner of a corresponding 3D area, a width, and/or height information.

In the apparatuses 100 and 200, an indicator indicating whether the spatial interval 3D reproduction information may be referred to as a variable called 'spatial_local_3d_indicator'.

In other words, when 'spatial_local_3d_indicator' is proclaimed in an unsigned int type (syntax 710) and 'spatial_local_3d_indicator' has a value of 1 (syntax 720), a variable 'horizontal_offset' indicating a horizontal offset and a variable 'vertical_offset' indicating a vertical_offset as a coordinate of a spatial interval 3D area, a variable 'local_3d_width' indicating a width of the spatial interval 3D area, and a variable 'local_3d_height' indicating a height of the spatial interval 3D area may be defined as the spatial interval 3D reproduction information (syntax 730).

Syntax 730 shows when the number of the spatial interval 3D areas is 1, but when the number of the spatial interval 3D areas is 2 or more, the number of the spatial interval 3D areas is defined by a variable called 'number_of_local_3d', and a horizontal_offset, a vertical_offset, a width, and a height may be defined for each spatial interval 3D area.

Figure 8:
FIG. 8 illustrates 3D camera information according to an exemplary embodiment.

FIG. 8 illustrates 3D camera information according to an exemplary embodiment.

According to 3D camera information in a stereo image, a camera parameter of one view image may be expressed in a relative value based on a camera parameter of another view image. In other words, a camera parameter of a right view image may be expressed based on a coordinate of a left view image, and thus only a relative value may be transmitted and/or received without defining camera parameters of both of the left view image and the right view image. However, information about coordinates of a focal length and a principal point from among the 3D camera information has a absolute value, and thus cannot be relatively expressed. Accordingly, the focal length and the principal point are separately defined according to each view.

In the apparatuses 100 and 200, an indicator indicating whether 3D camera information is changed may be referred to as a variable called 'is_cam_params_changed'. Since the 3D camera information is large data, the 3D camera information is pre-defined to be newly set only when current 3D camera information is different from previous 3D camera information, by using 'is_cam_params_changed'. Accordingly, 'is_cam_params_changed' is set to 1 only when the 3D camera information needs to be newly set or to be updated.

For example, when 'is_cam_params_changed' is proclaimed in an unsigned int type (syntax 810) and 'is_cam_params_changed' has a value of 1 (syntax 820), a variable 'rotation' that indicates rotation angle information between a first view camera and a second view camera in a x-y coordinate, a variable 'translation' indicating translation information between the first view and second view cameras in a x-y coordinate, a variable 'primary_focal_length' indicating focal_length information of a first view image, a variable 'secondary_focal_length' indicating focal_length information of a second view image, a variable 'aspect_ratio' indicating screen aspect ratio information, a variable 'primary_principal_point_x' indicating x-axis coordinate information of a principal point of a first view image, a variable 'primary_principal_point_y' indicating y-axis coordinate information of a principal point of a first view image, a variable 'secondary_principal_point_x' indicating x-axis coordinate information of a principal point of a second view image, and a variable 'secondary_principal_point_y' indicating an y-axis coordinate information of a principal point of a second view image may be defined as 3D camera information (syntax 830).

Cameras having the same specification are used considering a 3D effect, and thus screen aspect ratio information may be defined only once with respect to a left/right view image or a multi view image. Rotation angle information and parallel translation information may be expressed in relative numbers of a coordinate of a second view image based on a coordinate of a first view image. Focal length and principal point information may be defined according to each view.

3D camera information of a stereo image may be defined once, instead of being defined according to each of a left view image and a right view image as shown in FIG. 8. Meanwhile, in case of a multiple stream type format that is applicable to a multi view image, 3D camera information may be independently defined according to each view, instead of being expressed in a relative number based on a coordinate of one view.

An arrangement of two cameras obtaining two view points may be determined based on 3D camera information. Generally, when a 3D image is reproduced, a 3D image obtained via a parallel camera configuration has lower viewing fatigue than a 3D image obtained via a toed-in camera configuration. Accordingly, a 3D image obtained via a toed-in camera configuration may be changed into a 3D image obtained via a parallel camera configuration via a rectification operation using 3D camera information.

An epipolar line may be determined by using 3D camera information, and disparity estimation may be conveniently performed via a epipolar line constraint technique using the epipolar line. As described above, 3D camera information may be used in various post-process operations including the rectification operation and the disparity estimation.

Figure 9:
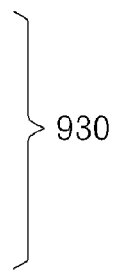
FIG. 9 illustrates low fatigue information according to an exemplary embodiment.
Figures 10, 11:
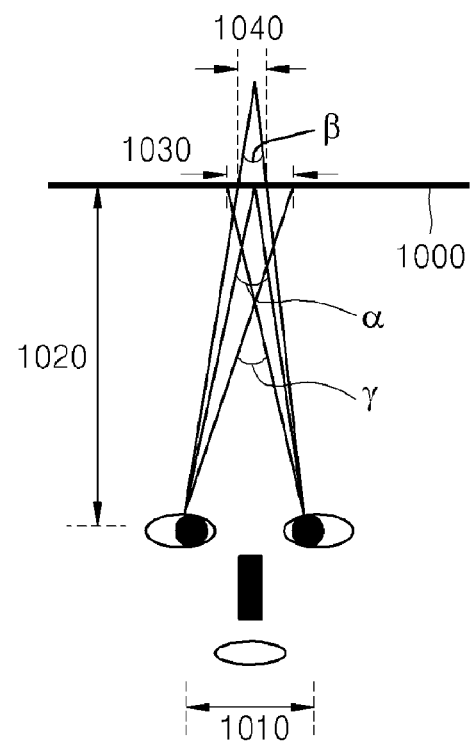
FIG. 10 illustrates a low fatigue range according to an exemplary embodiment.
FIG. 11 illustrates left and right imbalance information according to an exemplary embodiment.

FIG. 9 illustrates low fatigue information according to an exemplary embodiment.

A 3D effect may differ according to the size of a display screen reproducing a 3D image. Accordingly, when a 3D image is reproduced in an environment that is different from or worse than an expected environment, a post-process operation may be performed so as to reduce viewing fatigue. For example, a 3D image may be changed when an actual display size is larger than an expected display size, and thus viewing fatigue may be generated. Examples of the post-process operation for reducing viewing fatigue include a method of generating new left and right view images having adjusted depth by extracting a depth map between the left and right view images, a method of synthesizing an intermediate image, and a method of moving a left/right view image in parallel. Low fatigue information may be used to determine which low fatigue operation is to be performed.

In the apparatuses 100 and 200, an indicator indicating whether low fatigue information is changed may be referred to as a variable called 'is_safety_params_changed'. Since low fatigue information is large data, the low fatigue information may be pre-defined to be newly set only when current low fatigue information is different from previous low fatigue information via 'is_safety_params_changed'. Accordingly, 'is_safety_params_changed' is set to 1 only when low fatigue information is newly set or needs to be updated.

For example, when 'is_safety_params_changed' is proclaimed in an unsigned int type (syntax 910) and 'is_safety_params_changed' has a value of 1 (syntax 920), a variable 'expected_display_width' indicating expected display width information, a variable 'expected_display_height' indicating expected display height information, a variable 'expected_viewing_distance' indicating expected viewing distance information, a variable 'min_of_disparity' indicating minimum disparity information in a 3D image content, and a variable 'max_of_disparity' indicating maximum disparity information in a 3D image content may be defined as low fatigue information (syntax 930).

In order to calculate a screen disparity of a provided 3D image content, an expected display size, an expected viewing distance, and a disparity range in a 3D image are required. The expected display size and the expected viewing distance are expressed by using the expected display width and height information and the expected viewing distance information. A disparity range in a 3D image may be expressed by using the minimum disparity information and the maximum disparity information in a 3D image content.

Accordingly, it is determined whether the low fatigue operation is to be performed by comparing a disparity range according to an expected display with an actual disparity range by using the low fatigue information.

FIG. 10 illustrates a low fatigue range according to an exemplary embodiment.

A screen disparity range that has allowable viewing fatigue of a 3D image may be determined within ±1°. The screen disparity range of the 3D image may be determined based on a display size, a viewing distance, and a disparity range in the 3D image. In order to calculate a low fatigue range, i.e. the screen disparity range that has allowable viewing fatigue, a pixel pitch of an actual display is required. The pixel pitch may be determined as a fixed value in a reproduction apparatus.

A low fatigue range will now be described with reference to FIG. 10, wherein a pixel pitch of a display 1000 is 0.159 mm, a display size of the display 1000 is 2.5 inch, and a resolution of the display 1000 is 320×240. A distance 1010 between eyes of a viewer may be 65 mm, and a viewing distance 1020 may be 300 mm. A disparity range is calculated by using a difference angle α between two sights according to an expected depth, a difference angle β between two sights when the depth approaches toward the viewer, and a difference angle γ between two sights when the depth withdraws from the viewer.

In FIG. 10, a minimum disparity limit corresponds to the difference angle β, and a maximum disparity limit corresponds to the difference angle γ. In other words, the low fatigue range is within ±1°, and thus, is |β−α|<1° and |γ−α|<1°. For example, when the difference angle α is 12.37°, the difference angle β is 11.37° or more, and the difference angle γ is 13.37° or less.

Also, a pixel pitch of the display 1000 may be used to express the low fatigue range in a pixel unit. When the difference angle β of the minimum disparity limit is 11.37°, an image size on the display 100 is 5.32 mm, and when the difference angle γ of the maximum display limit is 13.37°, an image size on the display 1000 is 5.73 mm. A pixel unit of disparity may be expressed in a value obtained by dividing the disparity by a pixel pitch. Accordingly, maximum disparity limit pixels may be 5.73/0.159=36 pixels and minimum disparity limit pixels may be −5.32/0.159=−33 pixels. Here, a (−) direction denotes a direction toward the viewer.

It may be determined whether a current 3D image content is in a low fatigue allowable range by comparing a minimum disparity limit and a maximum disparity limit of a maximum allowable disparity range of an actual display system with a minimum disparity and a maximum disparity of an actual 3D image content. When the current 3D image content is not within the low fatigue allowable range, a post-process operation related to low fatigue may be performed.

Left and right imbalance information indicating imbalance between a left view image and a right view image will now be described with reference to FIGS. 11 through 13. Since a plurality of cameras are used to obtain a stereo image (or a multi view image), even if the cameras have the same specification, images taken by the cameras may not have the same color impression according to the settings of the cameras. Such a difference between a left view image and a right view image may deteriorate performance of a post-process operation, such as disparity estimation. Also, when the left view image and the right view image are reproduced in different color impression, viewing fatigue due to a 3D image may be increased.

An operation of compensating a difference between a left view image and a right view image may be performed as a pre-process or post-process operation. The operation may be performed as a post-process operation after decoding according to viewer's demands. Here, the left and right imbalance information is required for the post-process operation after decoding.

FIG. 11 illustrates left and right imbalance information according to an exemplary embodiment.

A simple left and right imbalance model is represented by Equation (1) below.

$$R = L + \text{offset1} \tag{1}$$

Here, R denotes a pixel value of a right view image, L denotes a pixel value of a left view image, and offset1 denotes a variable indicating an offset value between the left and right view images. In other words, imbalance information between the left and right view images is defined by one offset value. The simple left and right imbalance model described in FIG. 11 is preferable when the left and right offset information cannot assign large number of bits to left and right imbalance information.

For example, in the apparatuses 100 and 200, an indicator indicating whether left and right imbalance information is defined may be referred to as a variable called 'imbalance_info_indicator'. 'imbalance_info_indicator' has a value of 1 only when the left and right imbalance information is defined.

According to syntax of left and right imbalance information according to Equation (1), when 'imbalance_info_indicator' is proclaimed in an unsigned int type (syntax 1110) and 'imbalance_info_indicator' has a value of 1 (syntax 1120), a variable 'imbalance_offset' indicating left and right offset information may be defined as left and right imbalance information (syntax 1130).

FIG. 12 illustrates left and right imbalance information according to an exemplary embodiment.

A left and right imbalance model according to a linear function is represented by Equation (2) below.

$$R = scale \times L + offset2 \qquad (2)$$

Here, R denotes a pixel value of a right view image, L denotes a pixel value of a left view image, scale denotes a slope of a linear function, and offset2 denotes a variable indicating an offset value between the left view image and the right view image. In other words, imbalance information between the left and right view images may be defined as a linear relationship between the left and right view images. A number of bits assigned to 'scale' for slope information may be adjusted according to accuracy of the linear function.

According to syntax of left and right imbalance information according to Equation (2), when 'imbalance_info_indicator' is proclaimed in an unsigned int type (syntax 1210) and 'imbalance_info_indicator' has a value of 1 (syntax 1220), a variable 'imbalance_offset' indicating left and right offset information and a variable 'imbalance_scale' indicating slope information of a linear function of a left and right imbalance model may be defined as the left and right imbalance information (syntax 1230).

FIG. 13 illustrates left and right imbalance information according to an exemplary embodiment.

A left and right imbalance model according to a look up table is represented by Equation (3) below.

$$R[0] = first\_value$$

$$R[L] = R[L-1] + increment[L-1] \qquad (3)$$

Here, R denotes a pixel value of a right view image, L denotes a pixel value of a left view image, first_value denotes an initial value of the pixel value of the right view image, and increment denotes an increased amount of the pixel value of the right view image. As the pixel value of the left view image increases by 1, a corresponding pixel value of the right view image may be defined as an increased amount of the pixel value of the right view image.

According to syntax of left and right imbalance information according to Equation (3), when 'imbalance_info_indicator' is proclaimed in an unsigned int type (syntax 1110) and 'imbalance_info_indicator' has a value of 1 (syntax 1320), a variable 'first_value' indicating an initial value of a pixel value of a right view image, and a variable 'increment' indicating an increased amount of a pixel value of a right view image may be defined as left and right imbalance information (syntax 1330).

Among Equations (1), (2), and (3), the left and right imbalance information according to Equation (3) corresponds to the most accurate model, and the left and right imbalance information according to Equation (1) corresponds to the simplest model.

FIG. 14 illustrates 3D image reproduction information according to an exemplary embodiment.

When the 3D image reproduction information according to the current exemplary embodiment includes the 3D image format information, the left and right arrangement information, the full resolution information, the spatial interval 3D reproduction information, the temporal interval 3D reproduction information, the 3D camera information, the low fatigue information, and the left and right imbalance information, syntax as shown in FIG. 14 may be used.

In syntax 1420, 1430, and 1440, 3D image format information '3d_format_type', left and right arrangement information 'LR_indicator', and full resolution information 'Full_Res_indicator' are respectively proclaimed as essential information of the 3D image reproduction information.

In additional information of the 3D image reproduction information, an indicator indicating whether each parameter is defined or is changed is proclaimed. In other words, in syntax 710 and 510, an indicator indicating whether the spatial interval 3D reproduction information is defined, and an indicator indicating whether the temporal interval 3D reproduction information is defined are proclaimed. Also in syntax 810, an indicator indicating whether the 3D camera information is changed is proclaimed, and in syntax 910, an indicator indicating whether the low fatigue information is changed is proclaimed. Similarly in syntax 1110, an indicator indicating whether left and right imbalance information is defined is proclaimed.

As described above with reference to FIG. 7, when 'spatial_local_3d_indicator' has a value of 1 (syntax 720), horizontal_offset information and vertical_offset information ('horizontal_offset' and 'vertical_offset') of a coordinate of a spatial interval 3D area, and width information and height information ('local_3d_width' and 'local_3d_height') of the spatial interval 3D area may be defined as the spatial interval 3D reproduction information (syntax 730).

As described above with reference to FIG. 5, when 'temporal_local_3d_indicator' has a value of 1 (syntax 520), picture number information ('remaining_3d_pictures') of an interval 3D image may be defined as the temporal interval 3D reproduction information (syntax 530).

As described above with reference to FIG. 8, when 'is_cam_params_changed' has a value of 1 (syntax 820), rotation angle information ('rotation'), translation information ('translation'), focal length information of a first view image ('primary_focal_length'), focal_length information of a second view image ('secondary_focal_length'), screen aspect ratio information ('aspect ratio'), x-axis coordinate information of a principal point of the first view image ('primary_principal_point_x'), y-axis coordinate information of the principal point of the first view image ('primary_principal_point_y'), x-axis coordinate information of a principal point of the second view image ('secondary_principal_point_x'), and y-axis coordinate information of the principal point of the second view image ('secondary_principal_point_y') may be defined as the 3D camera information (syntax 830).

As described above with reference to FIG. 9, when 'is_safety_params_changed' has a value of 1 (syntax 920), expected display width information ('expected_display_width'), expected display height information ('expected_display_height'), expected viewing distance information ('expected_viewing_distance'), minimum disparity information in 3D image content ('min_of_disparity'), and maximum disparity information in 3D image content ('max_of_disparity') may be defined as the low fatigue information (syntax 930).

As described above with reference to FIG. 12, when 'imbalance_info_indicator' has a value of 1 (syntax 1220), left and right offset information ('imbalance_offset') and slope information ('imbalance_scale') of a linear function of a left and right imbalance model may be defined as the left and right imbalance information (syntax 1230).

3D image reproduction information may be inserted into different spaces in a data stream as occasion demands. The apparatus 100 as shown in FIG. 1 may determine an insertion area in a data stream according to importance of 3D image reproduction information. 3D image reproduction information having high priority may be arranged from an area where a demultiplexing or parsing operation is performed first while decoding a 3D image data stream.

For example, when 3D image format information, left and right arrangement information, and full resolution information have higher priority than 3D camera information, low fatigue information, and left and right imbalance information, the 3D image format information, the left and right arrangement information, and the full resolution information may be inserted into a data stream in such a way that the 3D image format information, the left and right arrangement information, and the full resolution information are demultiplexed or parsed first.

Figure 15A:
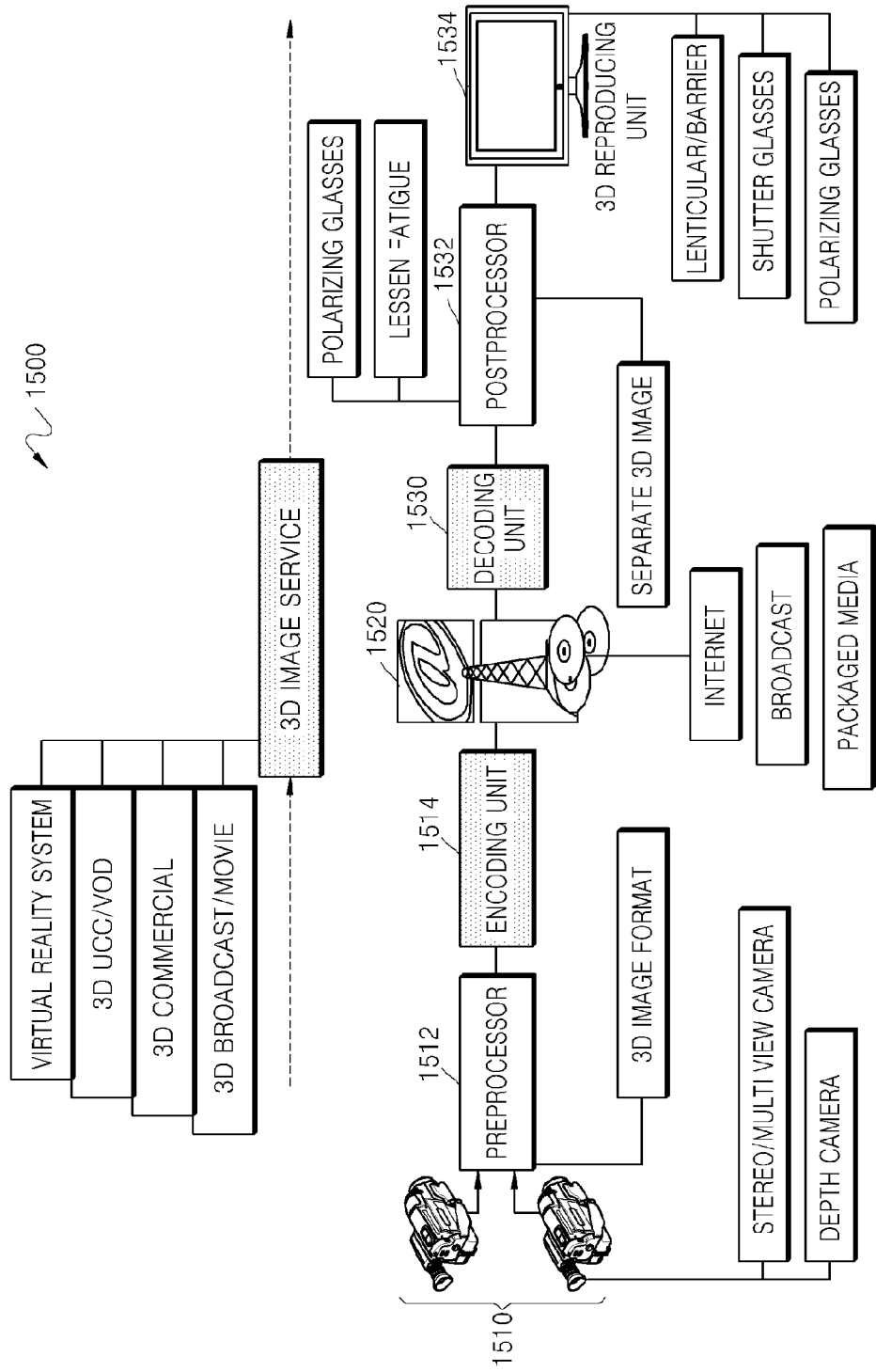
FIG. 15A is a block diagram of a 3D image service system for providing a 3D image service by using 3D image reproduction information, according to an exemplary embodiment.

FIG. 15A is a block diagram of a 3D image service system 1500 for providing a 3D image service by using 3D image reproduction information, according to an exemplary embodiment.

A producer may provide various types of 3D image services to a user. Examples of a 3D image service include a virtual reality system, a 3D user created content (UCC) or video on demand (VOD), a 3D commercial, and a 3D broadcast or image. The 3D UCC may be created by a user and provided to another user via the Internet. A broadcasting company may provide a 3D broadcast to a viewer by manufacturing a 3D image and transmitting the 3D image via airwaves or cables. A film company may provide a 3D movie to a consumer by using a 3D digital versatile disc (DVD) or 3D Blu-ray disc (BD) via a distributor.

The 3D image services may be provided in an image format such as a TS, program stream, or an International Standardization Organization (ISO)-based media file format.

The 3D image service system 1500 performs an overall operation of a 3D image service provided from a producer to a consumer. The 3D image service system 1500 includes an image obtaining unit 1510, a preprocessor 1512, an encoding unit 1514, a communicating unit 1520, a decoding unit 1530, a postprocessor 1532, and a 3D reproducing unit 1534. The image obtaining unit 1510, the preprocessor 1512, and the encoding unit 1514 may be included in a transmitting terminal, and the decoding unit 1530, the postprocessor 1532, and the 3D reproducing unit 1534 may be included in a receiving terminal.

The image obtaining unit 1510 obtains a multi view image photographed in a plurality of view points by using at least two cameras. A depth camera, which may directly obtain depth information between images having different view points, may be used as a camera of the 3D image obtaining unit 1510, besides a general camera that obtains a color image.

The preprocessor 1512 prepares to compress images obtained by the image obtaining unit 1510 via preprocess operations. The preprocess operations may merge a left view image and a right view image into a 3D image format, such as a stereo image format. Alternatively, the preprocess operations may perform advance preparations required to perform video compression. For example, a camera parameter, a low fatigue parameter, or the like may be determined via camera calibration. Alternatively, correspondence between the left view image and the right view image may be determined.

The encoding unit 1514 may encode a 3D image by using a related art encoding method, by arranging the 3D image on a related art 2D image frame or using a plurality of related art encoders. Alternatively, the encoding unit 1514 may encode the 3D image by suing a new 3D encoder using multiview video coding (MVC) technique or 3D video encoding technique defined by Moving Picture Experts Group (MPEG).

The communicating unit 1520 may transmit compressed image data via the Internet or a broadcast, or store the compressed image data in a packaged media form. The compressed image data needs to be converted into a data format suitable for a corresponding system, in order for the communicating unit 1520 to transmit the compressed image data.

For example, in an MPEG-TS system, the compressed image data is converted from an ES into a packetized ES. In a wide term, a multiplexing process may also be conversion. Data in a packetized ES form may be converted into a program stream form so as to be stored as a packaged media, and into a TS form so as to be transported. When the compressed image data is converted into the ISO-based media file format of an MPEG-4 system, a data stream where a header including 'moov' box is added to image data in an ES form may be generated, transmitted, or stored.

Besides, a method of compressing and storing/transmitting image data may follow various standards. 3D image reproduction information including imbalance information, full resolution information, left and right arrangement information, interval 3D reproduction information, 3D camera information, and low fatigue information, according to an exemplary embodiment may be transmitted in various data formats described above, along with 3D image data.

The receiving terminal may receive data converted into a predetermined data form, and then convert the received data into a form recognizable by the decoding unit 1530. When the receiving terminal uses two or more decoders for a 3D image, the 3D image reproduction information is directly transmitted to the 3D reproducing unit 1534 so as to be used to reproduce the 3D image restored by the decoding unit 1530 in 3D.

The postprocessor 1532 converts the 3D image restored by the decoding unit 1530 into a form reproducible by the 3D reproducing unit 1534. For example, the postprocessor 1532 may separate a 3D image format into a left view 2D image and a right view 2D image. Also, the postprocessor 1532 may not only render the 3D image, but may also reduce fatigue by using 3D camera information and low fatigue information.

The 3D reproducing unit 1534 reproduces multi view images in 3D by using the 3D image reproduction information. The 3D reproducing unit 1534 may use 3D reproducing technique such as a lenticular method, a barrier method, a shutter glasses method, or polarizing glasses method.

Accordingly, the 3D image service system 1500 effectively compresses, transmits, receives, restores, and uses the 3D image reproduction information.

Figure 15B:
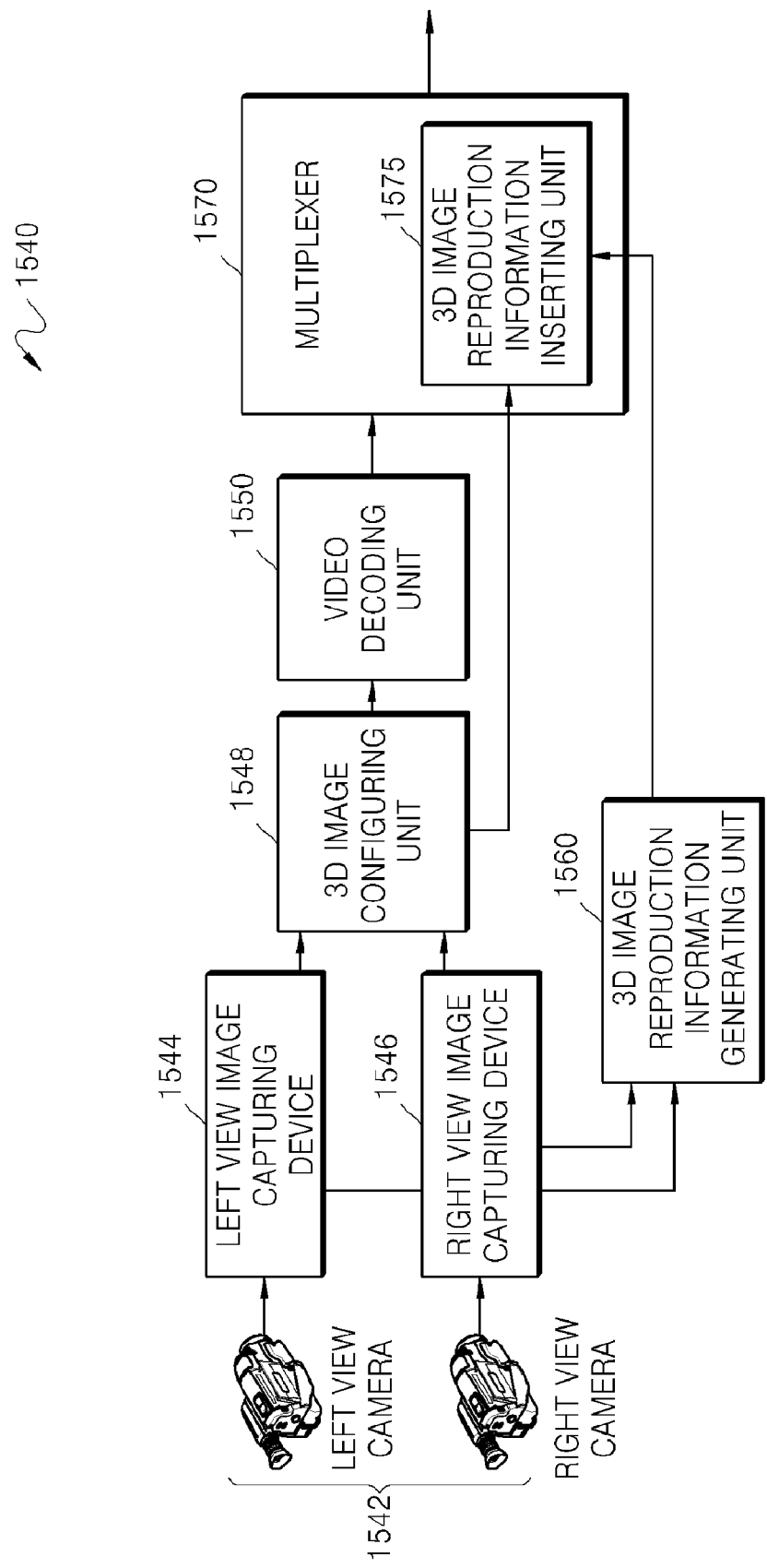
FIG. 15B is a block diagram of an apparatus for transmitting a 3D image, the apparatus generating 3D image reproduction information, according to an exemplary embodiment.

FIG. 15B is a block diagram of an apparatus 1540 for transmitting a 3D image, the apparatus 1540 generating 3D image reproduction information, according to an exemplary embodiment.

The apparatus 1540 may generate parameters on left and right views of a stereo image. The apparatus 1540 includes two cameras 1542, a left view image capturing device 1544, a right view image capturing device 1546, a 3D image configuring unit 1548, a video decoding unit 1550, a 3D image reproduction information generating unit 1560, and a multiplexer 1570.

A left view image sequence and a right view image sequence, which are respectively photographed by a left view camera and a right view camera of the cameras 1542, and respectively captured by the left view image capturing device 1544 and the right view image capturing device 1546 are generated.

The 3D image configuring unit 1548 configures the left view image sequence and the right view image sequence in a 3D image format, such as a side by side format, a top and bottom format, or the like. According to the employed 3D image format, the 3D image configuring unit 1548 may output 3D image reproduction information, such as 3D image format information, left and right arrangement information, full resolution information, interval 3D reproduction information, or the like, and transmit the output 3D image reproduction information to the multiplexer 1570.

The video decoding unit 1550 compresses the 3D image format and outputs the compressed 3D image format in an ES form. The multiplexer 1570 converts compressed 3D image data in an ES form into a data format, such as a TS, a program stream, or an ISO based media file format.

The 3D image reproduction information generating unit 1560 generates various types of 3D image reproduction information required to reproduce the left view image and the right view image respectively obtained from the left view image capturing device 1544 and the right view image capturing device 1546, in 3D. Here, the 3D image reproduction information generated by the 3D image reproduction information generating unit 1560 may include parameters related to a camera, parameters related to low fatigue, and imbalance information.

The 3D image reproduction information, such as the 3D image format information, the left and right arrangement information, the full resolution information, and the interval 3D reproduction information, output by the 3D image configuration unit 1548, and the 3D image reproduction information, such as the parameters related to a camera, the parameters related to low fatigue, and the imbalance information, generated by the 3D image reproduction information generating unit 1560 are input to a 3D image reproduction information inserting unit 1575 of the multiplexer 1570.

The 3D image reproduction information inserting unit 1575 may insert the 3D image reproduction information into the 3D image data format generated by the multiplexer 1570. Accordingly, not only the compressed 3D image data, but also the 3D image reproduction information is included in the 3D image data format generated by the multiplexer 1570.

The 3D image reproduction information generated by the apparatus 1540 may be used by the apparatus 100 as shown in FIG. 1. Alternatively, the multiplexer 1570 of the apparatus 1540 may correspond to the apparatus 100.

Here, the 3D image reproduction information inserting unit 1575 determines at least one of a TS, an ES, and a section in which the 3D image reproduction information is to be inserted. Accordingly, the 3D image reproduction information inserting unit 1575 may control at least one of the packetized ES generator 120, the section generator 130, and the TS packet generator 140 as shown in FIG. 1 to insert the 3D image reproduction information into a certain area.

Figure 15C:
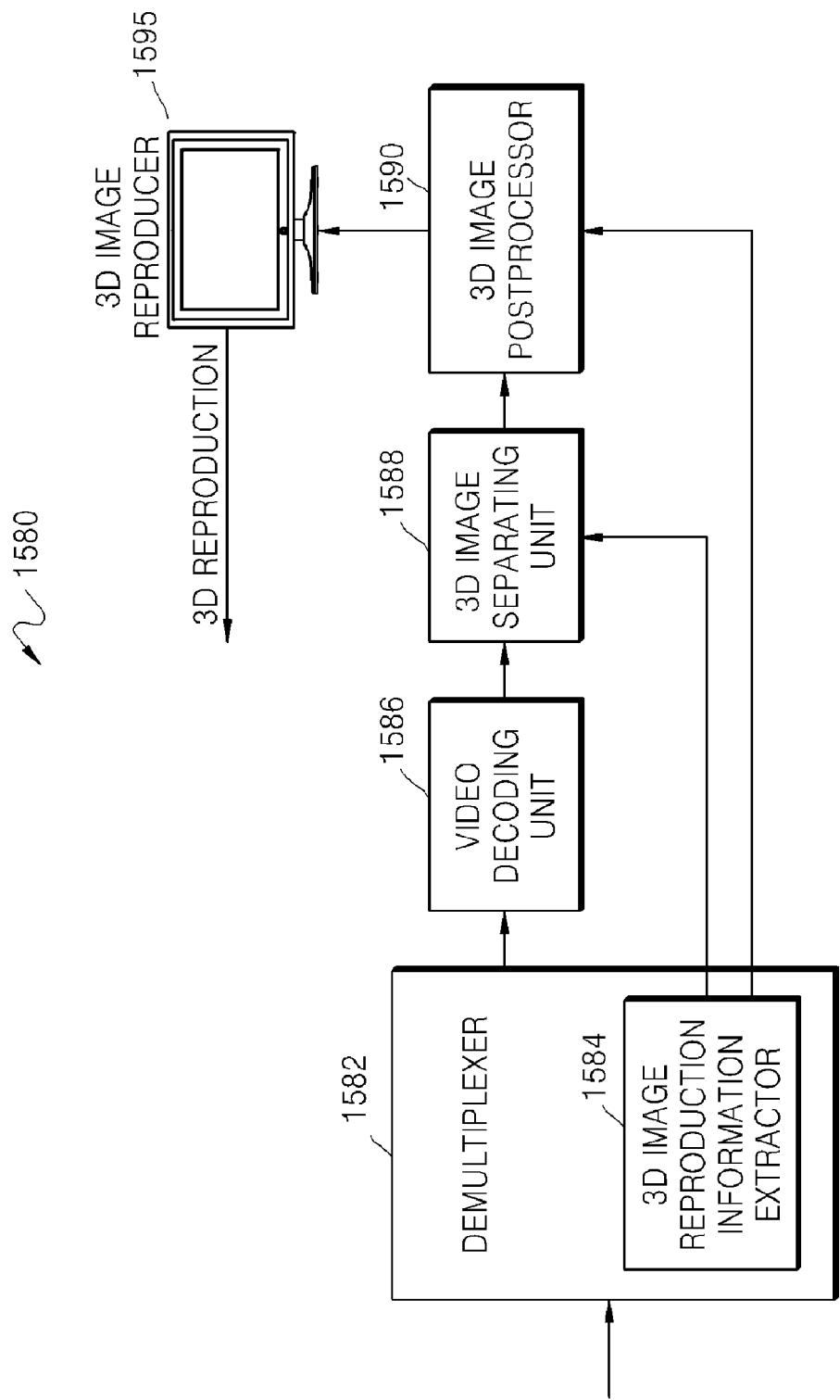
FIG. 15C is a block diagram of an apparatus for reproducing a 3D image, the apparatus using 3D image reproduction information, according to an exemplary embodiment.

FIG. 15C is a block diagram of an apparatus 1580 for reproducing a 3D image, the apparatus 1580 using 3D image reproduction information, according to an exemplary embodiment.

The apparatus 1580 may reproduce a stereo image in a left view and a right view. The apparatus 1580 includes a demultiplexer 1582, a video decoding unit 1586, a 3D image separating unit 1588, a 3D image postprocessor 1590, and a 3D image reproducer 1595.

The apparatus 1580 receives a 3D image data stream in a TS, a program stream, or an ISO-based media file format. The demultiplexer 1582 may demultiplex the received 3D image data stream, and classify and extract an ES and 3D image reproduction information about a 3D image.

The video decoding unit 1586 restores 3D image data from the extracted ES about the 3D image. The 3D image data may not only have a 3D image format, such as a side by side format, but also have a format using depth data or a format using at least two ESs.

A 3D image reproduction information extractor 1584 included in the demultiplexer 1582 extracts 3D image format information, left and right arrangement information, full resolution information, interval 3D reproduction information, parameters related to a camera, parameters related to low fatigue, and imbalance information from among the 3D image reproduction information.

The 3D image format information, the left and right arrangement information, the full resolution information, and the interval 3D reproduction information may be output to the 3D image separating unit 1588, and the parameters related to a 3D camera system, the parameters related to low fatigue, and the imbalance information may be output through the 3D image postprocessor 1590.

The 3D image separating unit 1588 separates the 3D image into a left view image and a right view image, by using the 3D image format information, the left and right arrangement information, the full resolution information, and the interval 3D reproduction information extracted by the 3D image reproduction information extractor 1584. The 3D image postprocessor 1590 may calibrate the 3D image so as to reduce 3D fatigue, by using the parameters related to a 3D camera system, the parameters related to low fatigue, and the imbalance information.

The 3D image processed by the 3D image postprocessor 1590 is reproduced by the 3D image reproducer 1595.

The apparatus 200 as shown in FIG. 2 may correspond to the apparatus 1580. In other words, the TS demultiplexer 210, the TS packet depacketizer 220, the PES depacketizer 230, and the 3D image reproduction information extractor 240 correspond to the demultiplexer 1582 and the 3D image reproduction information extractor 1584. Also, the 3D image restorer 250 may correspond to the video decoding unit 1586 and the 3D image separating unit 1588. The 3D image reproducer 260 may correspond to the 3D image postprocessor 1590 and the 3D image reproducer 1595.

FIG. 16A illustrates a PID table of a TS header.

In FIG. 16A, the apparatuses 100 and 200 as shown in FIGS. 1 and 2, respectively, use a TS structure so as to transmit and receive a data stream. Here, 3D image information is transmitted, stored, received, or reproduced in the TS structure.

While encoding 3D image data, the 3D image data is compressed to an ES, and PESs are generated by dividing the ES into packets and adding a header to each packet. A TS may be generated to transmit the PESs or a program stream may be generated to store the PESs.

The TS includes one or more TS packets. The TS packet is in a 188 byte unit, and includes a header in four (4) bytes and a payload in 184 bytes. Various types of information, such as PID information that indicates a type of a TS packet, may be inserted into a header area of the TS packet.

For example, referring to the PID table of FIG. 16A, when values of the PID are 0x0000, 0x0001, and 0x0002, the TS packets respectively include a PAT section, a conditional access table (CAT) section, and a TS description table section.

Also, a network PID of a TS packet that is to include a network information table, a program map PID of a TS that is to include a program map section, an elementary PID of a TS packet that is to include combined program element, and a PID for other purposes are included in TS packets having PID values of 0x0010 through 0x1FFE.

Figure 16B:
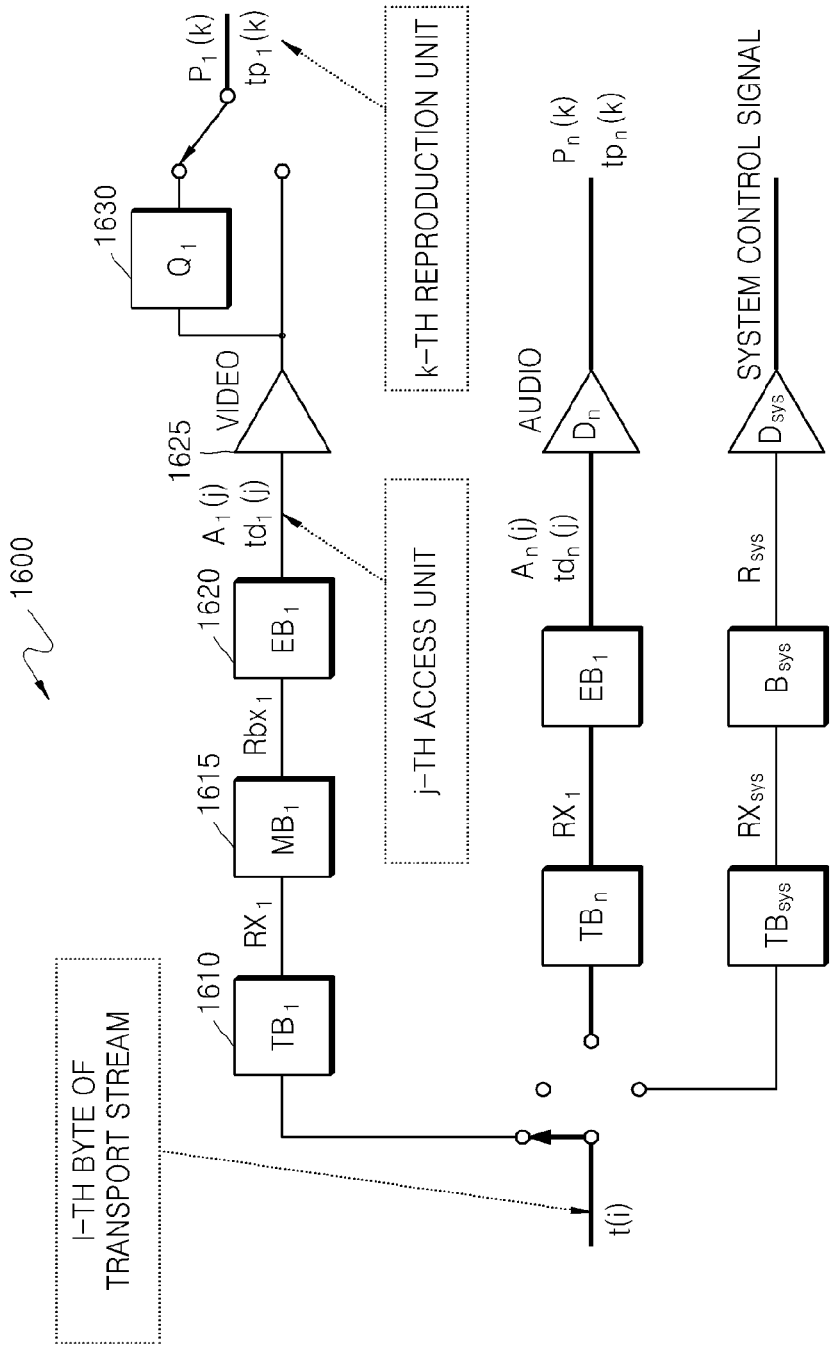
FIG. 16B is a block diagram of a TS system target decoder (TS-STD) according to an exemplary embodiment.

FIG. 16B is a block diagram of a TS system target decoder (TS-STD) 1600.

Processes until a program is reproduced by demultiplexing a TS received by the TS-STD 1600 will now be described.

In FIG. 16B, t(i) denotes an i-th byte of a TS, $TB_x$ 1610 denotes a transport buffer for an ES x, $MB_y$ 1615 denotes a multiplex buffer for an ES y, and $EB_z$ 1620 denotes an ES buffer for an ES z. $D_a$ 1625 denotes a decoding unit for an ES a, and $O_b$ 1630 denotes a rearrangement buffer for a video ES b.

$RX_n$ denotes a speed of deleting data from a transport buffer $TB_n$, $Rbx_1$ denotes a speed of deleting PES payload data from a multiplex buffer $MB_1$, $A_n(j)$ denotes a j-th access unit in a decoding order of an ES n, $td_n(j)$ denotes a decoding time in the TS-STD 1600 of the j-th access unit in the ES n, $P_n(k)$ denotes a k-th reproduction unit in a reproduction order of the ES n, and $tp_n(k)$ denotes a reproduction time in the TS-STD 1600 of the k-th reproduction unit in the ES n.

Since program list information is required to obtain information about a provided program, PAT information including the program list information needs to be obtained. Accordingly, a TS packet having a PID of 0, i.e. a TS packet including the PAT information is detected, according to the PID table shown in FIG. 16A.

Program information and PID information of a program to be viewed are provided via the PAT information, and thus a PMT of a desired program may be selected. Since the PMT include PID information of ESs of video, audio, and data information, a PID of each ES can be determined. Accordingly, a desired ES can be accessed by determining a PID of each ES.

The TS-STD 1600 parses PIDs of header areas of following TS packets. Packets corresponding to an ES 1 including video data are transmitted to the transport buffer $TB_1$ 1610 in the TS-STD 1600, ES n packets including audio data are transmitted to the transport buffer $TB_n$, and ES sys packets including system control data are transmitted to a transport buffer $TB_{sys}$.

TS packets related to video information are converted to PESs, and stored in the multiplex buffer $MB_1$ 1615. Packets related to video information, packets related to audio information, and packets related to a system control signal are each demultiplexed, converted into an ES, and respectively stored in a multiplex buffer $EB_1$ 1620, a multiplex buffer $B_n$, and a multiplex buffer $B_{sys}$.

A video ES may be transmitted to a decoding unit $D_1$ 1625, an audio ES may be transmitted to a decoding unit $D_n$, and a system control signal ES may be transmitted to a decoding unit $D_{sys}$, thereby restoring image data, audio data, and system control data. Specifically, the restored image data is stored in the rearrangement buffer $O_1$ 1630 according to the reproduction order, and thus rendered by a reproduction system, such as a digital TV system, while being delayed according to a reproduction period.

In the apparatuses 100 and 200 as shown in FIGS. 1 and 2, respectively, image data transmitted/received via a TS may be a 2D image or a 3D image. The TS-STD 1600 parses a data stream of an ES restored by demultiplexing the TS, and thus restores image data. However, the apparatus 200 may extract 3D image reproduction information inserted into a TS not only during a restoring process of image data of the TS-STD 1600, but also during a demultiplexing process of the TS before the restoring process.

A location and syntax of 3D image reproduction information in a TS will now be described with reference to FIGS. 17 through 31.

FIG. 17 is a diagram illustrating a data structure, wherein 3D image reproduction information is inserted into an adaptation field area 1724 of a TS packet 1710, according to an exemplary embodiment.

The apparatus 100 as shown in FIG. 1, according to an exemplary embodiment, inserts 3D image reproduction information into a private data byte area of an adaptation field area of a TS packet. Also, the apparatus 200 as shown in FIG. 2, according to an exemplary embodiment, extracts the 3D image reproduction information from the private data byte area of the adaptation field area of the TS.

Referring back to FIG. 17, a TS 1700 includes one or more TS packets. The TS packet 1710 includes a header area 1712 and a payload area 1714. Adaptation field control information 1722 is inserted into the header area 1712, and assignment of the adaptation field area 1724 is selectively determined according to the adaptation field control information 1722.

An optional field area 1736 may be selectively assigned to the adaptation field area 1724, according to a transport private data flag from among 5 flags 1734. A transport private data byte area 1744 may be assigned to the optional field area 1736, and 3D image reproduction information may be inserted into the transport private data byte area 1744.

In order to store the 3D image reproduction information in the transport private data byte area 1744 of the adaptation field area 1724, a space having the size of the 3D image reproduction information needs to be obtained.

The TS packet 1710 is 188 bytes, wherein the header area 1712 is four (4) bytes and the adaptation field area 1724 is 184 bytes. Other information having maximum 27 bytes is stored in the adaptation field area 1724 besides the 3D image reproduction information. Accordingly, the maximum capacity of the 3D image reproduction information is (184−27=) 157 bytes. Here, considering one (1) byte for transport private data length information 1742, total 156 bytes may be assigned for the 3D image reproduction information.

When left and right imbalance information is expressed in a look up table, the 3D image reproduction information is set to the maximum size, i.e. 138 bytes, and thus the 3D image reproduction information can be inserted into the transport private data byte area 1744.

Various types of information may be set as follows, for a data stream for inserting the 3D image reproduction information into the transport private data byte area 1744 of the adaptation field area 1724.

(i) The adaptation field control information 1722 is set to '10' or '11', (ii) Adaptation field length information has a value other than '0'.

(iii) The transport private data flag is set to '1', (iv) The transport private data length information 1742 needs to have a number of bytes corresponding to 3D start information 'threed_info_start_code' notifying start of 3D image reproduction information to be inserted into the transport private data byte area 1744, and the 3D image reproduction information.

(v) The 3D start information 'threed_info_start_code' is inserted into first two bytes of the transport private data byte area 1744. For example, in a case of ASCII code value, '3D' is inserted, and in a case of a hexa-code, '0x3444' is inserted.

(vi) Remaining 3D image reproduction information is inserted after the 3D start information 'threed_info_start_code' of the transport private data byte area 1744.

The apparatus 200, as shown in FIG. 2, reads the 3D start information 'threed_info_start_code', thereby determining that data inserted into the transport private data byte area 1744 is the 3D image reproduction information, and thus, reads and extracts the 3D image reproduction information after the 3D start information 'threed_info_start_code'.

FIG. 18 is a table showing a size of 3D image reproduction information, when left and right imbalance information uses a look up table, according to an exemplary embodiment.

Referring to the size of the 3D image reproduction information, 3D start information (threed_info_start_code) may be two (2) bytes, 3D image format information (3d_format_type), left and right arrangement information (LR_indicator), and full resolution information (Full_Res_indicator) may be one (1) byte, various indicators may be one (1) byte, spatial interval 3D reproduction information (spatial interval 3d) may be eight (8) bytes, temporal interval 3D reproduction information (temporal interval 3d) may be five (5) bytes, 3D camera information (camera parameters) may be 44 bytes, and low fatigue information (safety parameters) may be 12 bytes. Also, when left and right imbalance information (imbalance parameters) is expressed by using the look up table described with reference to FIG. 13, the left and right imbalance information may be 65 bytes.

Accordingly, the 3D image reproduction information according to the current exemplary embodiment may be total 138 bytes.

However, the size of the 3D image reproduction information may be adjusted according to a reproduction environment or a user.

FIG. 19 illustrates 3D image reproduction information inserted into an adaptation field area of a TS packet, according to an exemplary embodiment.

Syntax of 3D image reproduction information to be inserted into a transport private data byte area of an adaptation field area by the apparatus 100 or to be extracted from the transport private data byte area of the adaptation field area by the apparatus 200, according to an exemplary embodiment is as shown in FIG. 19.

In other words, 3D start information is proclaimed in syntax 1910, and 3D image format information, left and right arrangement information, and full resolution information are respectively proclaimed in syntax 1420, 1430, and 1440. Indicators indicating whether spatial interval 3D reproduction information is defined, whether temporal interval 3D reproduction information is defined, whether 3D camera information is changed, whether low fatigue information is changed, and whether left and right imbalance information is defined are respectively proclaimed in syntax 710, 510, 810, 910, and 1110.

Also, spatial interval 3D reproduction information may be proclaimed in syntax 720 and 730, and temporal interval 3D reproduction information may be proclaimed in syntax 520 and 530. 3D camera information may be proclaimed in syntax 820 and 830, and low fatigue information may be proclaimed in syntax 920 and 930.

When the left and right imbalance information expressed by using the look up table described with reference to FIG. 13 is used and 'imbalance_info_indicator' has a value of 1 in syntax 1920, initial value information ('first_value') of a right view image pixel value, increased amount information ('increment') of the right view image pixel value, and a reserved bit ('reserved') for information that may be added later may be proclaimed as the left and right imbalance information in syntax 1930.

Figure 20:
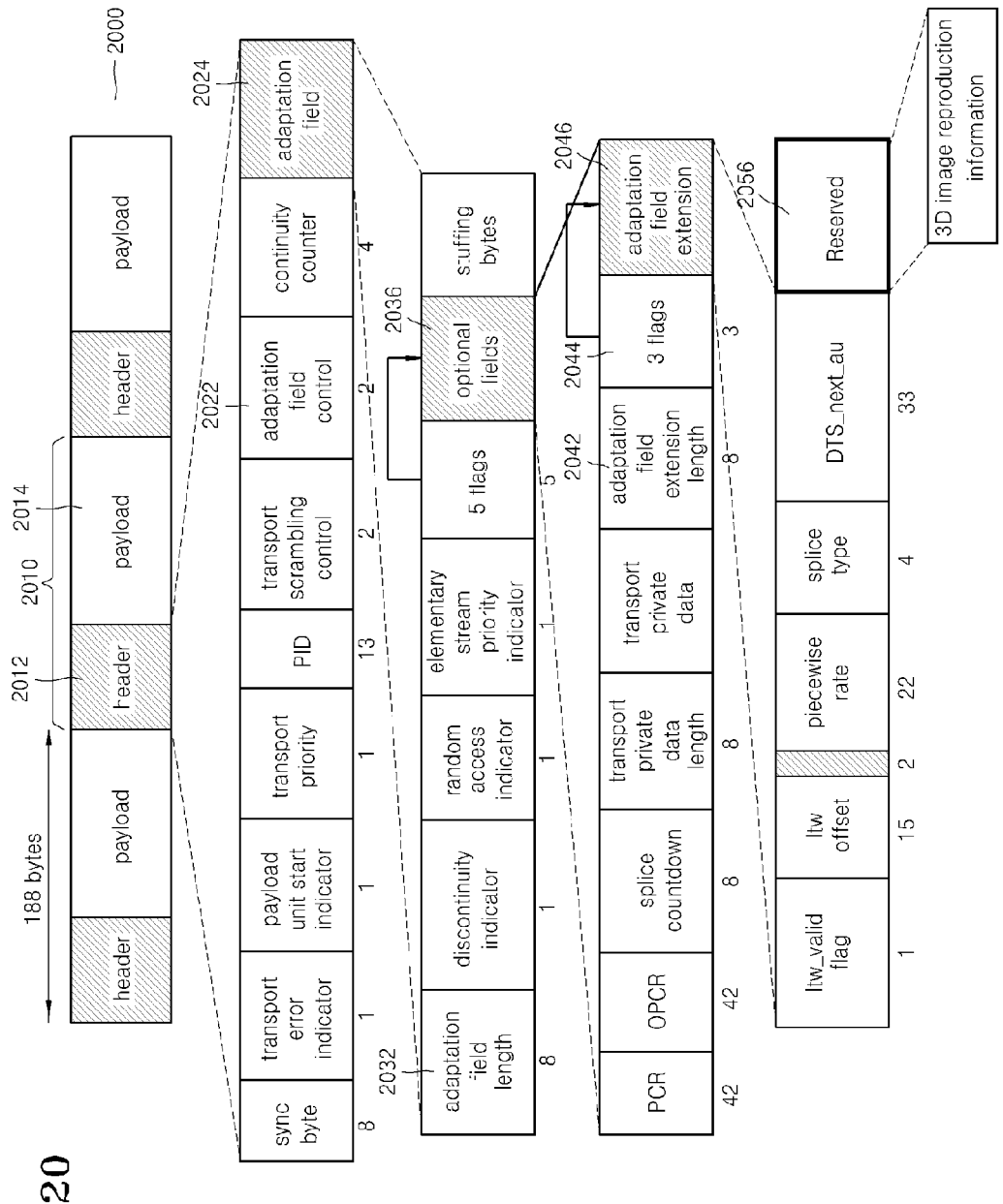
FIG. 20 is a diagram of a data structure, wherein 3D image reproduction information is inserted into an adaptation field extension area of a TS packet, according to an exemplary embodiment.

FIG. 20 is a diagram of a data structure, wherein 3D image reproduction information is inserted into an adaptation field extension area 2046 of a TS packet 2010, according to an exemplary embodiment.

According to another exemplary embodiment, the apparatus 100 inserts 3D image reproduction information into an adaptation field extension area of a TS packet, and the apparatus 200 extracts the 3D image reproduction information from the adaptation field extension area of the TS packet.

The TS packet 2010 of a TS 2000 includes a header area 2012 and a payload area 2014. The adaptation field extension area 2046 may be assigned to an optional field area 2036 of an adaptation field area 2024 of the header area 2012. The adaptation field extension area 2046 may be selectively assigned according to an adaptation field extension flag from among 3 flags 2044, and 3D image reproduction information may be inserted into the adaptation field extension area 2046.

Alternatively, the 3D image reproduction information may be inserted into a reserved area 2056 in the adaptation field extension area 2046.

Various types of information may be set as follows, for a data stream for inserting the 3D image reproduction information into the reserved area 2056 of the adaptation field extension area 2046.

(i) Adaptation field control information 2022 is set to '10' or '11', (ii) Adaptation field length information 2032 has a value other than '0'.

(iii) The adaptation field extension flag is set to '1', (iv) Adaptation field extension length information 2042 needs to have a number of bytes corresponding to other information to be inserted into the adaptation field extension area 2046, 3D start information 'threed_info_start_code', and the 3D image reproduction information.

(v) The 3D start information 'threed_info_start_code' is inserted into first two bytes of the reserved area 2056. For example, in a case of ASCII code value, '3D' is inserted, and in a case of a hexa-code, '0x3444' is inserted.

(vi) Remaining 3D image reproduction information is inserted after the 3D start information 'threed_info_start_code' of the reserved area 2056.

Compared to the previous exemplary embodiment wherein the 3D image reproduction information is inserted into the transport private data byte area, the structure of the 3D image reproduction information is the same, except the location.

Also, 5 indicators for spatial interval 3D reproduction information, temporal interval 3D reproduction information, 3D camera information, low fatigue information, and left and right imbalance information may be inserted into a reserved area 2056 of five (5) bytes after the 3 flags 2044.

Figure 21:
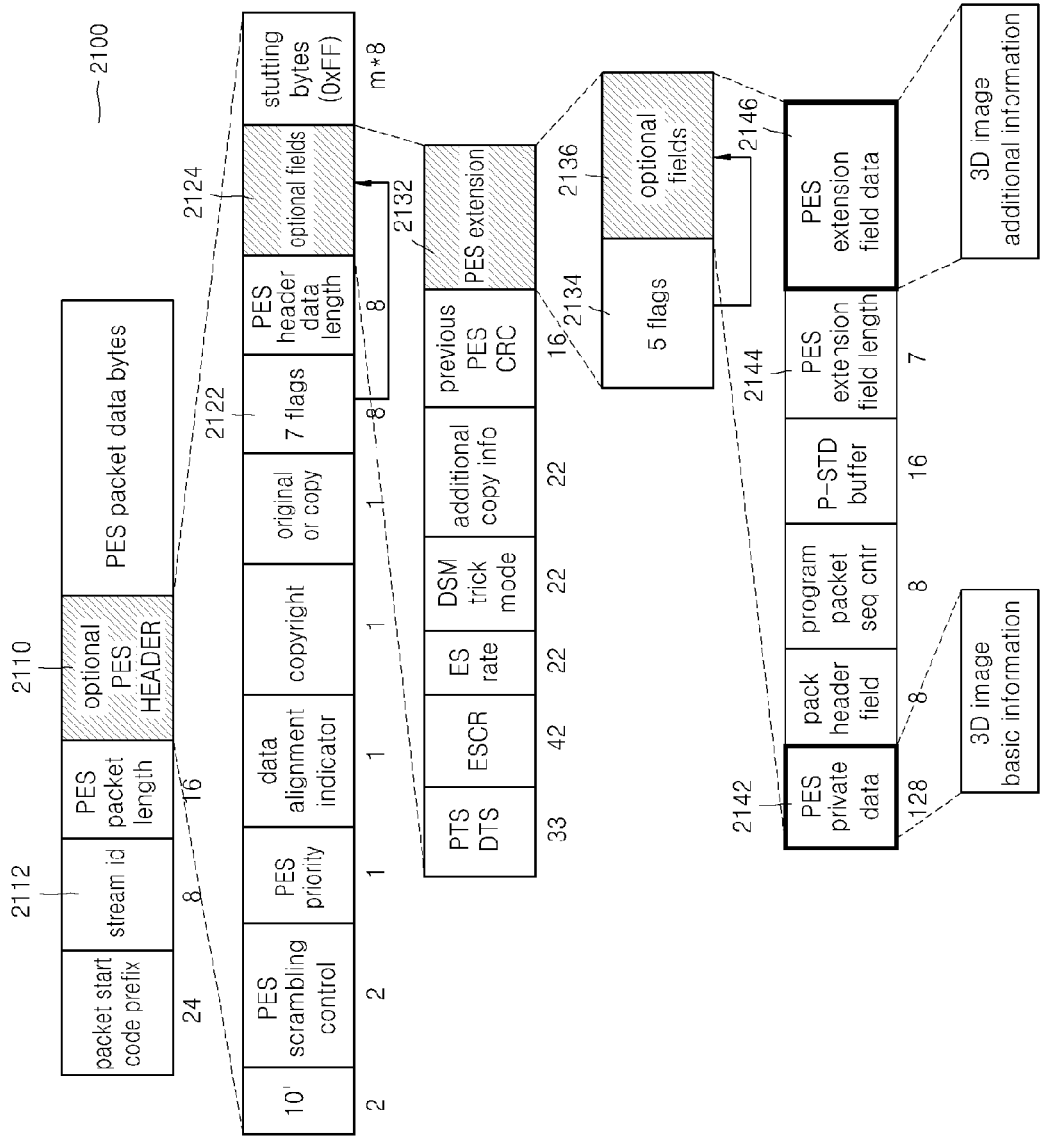
FIG. 21 is a diagram of a data structure, wherein 3D image reproduction information is inserted into an extension field area of a PES, according to an exemplary embodiment.

FIG. 21 is a diagram of a data structure, wherein 3D image reproduction information is inserted into an extension field data area 2146 of a PES 2100, according to an exemplary embodiment.

According to an exemplary embodiment, the apparatus 100 inserts 3D image reproduction information into an extension field data area of a PES, and the apparatus 200 extracts the 3D image reproduction information from the extension field area of the PES.

A first optional field area 2124 is assigned to an optional PES header area 2110 of an ES 2100. A PES extension field area 2132 may be selectively assigned to the first optional field area 2124, according to a first PES extension flag from among 7 flags 2122. In the current exemplary embodiment, 3D image reproduction information may be inserted into the PES extension field area 2132.

The PES extension field area 2132 includes a second optional field area 2136. A PES private data area 2142 and a PES extension field data area 2146 may be selectively assigned to the second optional field area 2136, according to a PES private data flag (PES_private_data_flag) and a second PES extension flag (PES_extension_flag) from among 5 flags

2134. 3D image reproduction information may be inserted into the PES private data area 2142 and the PES extension field data area 2146.

Here, a size of each of the PES private data area 2142 and the PES extension field data area 2146 may not be sufficient to include the 3D image reproduction image. Accordingly, the 3D image reproduction information may be divided and separately included in the PES private data area 2142 and the PES extension field data area 2146.

For example, the 3D image reproduction information may be divided into 3D image basic information and 3D image additional information, thereby storing the 3D image basic information in the PES private data area 2142 and the 3D image additional information in the PES extension field data area 2146. The 3D image basic information includes 3D start information, 3D image format information, left and right arrangement information, full resolution information, temporal interval 3D reproduction information, and spatial interval 3D reproduction information. The 3D image additional information includes remaining information of the 3D image reproduction information excluding the 3D image basic information.

However, when the PES extension field data area 2146 has a sufficient space to include the entire 3D image reproduction information, the entire 3D image reproduction information is inserted into the PES extension field data area 2146, without dividing the 3D image reproduction information into the 3D image basic information and the 3D image additional information.

Various type of information of the PES header 2110 may be set as follows, for a data stream structure for inserting the 3D image reproduction information into the PES private data area 2142 and the PES extension field data area 2146.

(i) Stream ID information 2112 is set to a value that includes information in the optional PES header 2110.

(ii) The first PES extension flag is set to '1'.

(iii) The PES private data flag and the second PES extension flag are each set to '1', (iv) The PES private data area 2142 includes the 3D image basic information from among the 3D image reproduction information, (v) PES extension field length information 2144 is set considering a data size of the 3D image additional information.

(vi) The 3D image additional information is inserted into the PES extension field data area 2146.

The stream ID information 2112 may be used to clearly determine that image content inserted into a PES is a 3D image. Accordingly, when a 2D decoder determines that the image content in a PES is a 2D image, the 2D decoder may decode the image content as a general video. When a 3D decoder determines the image content in a PES as a 3D image, the 3D decoder may read information included in the PES private data area 2142.

Regarding an ES, a process of generating a PES including a header and a payload is also referred to as an ES packetizing process. The apparatus 100 as shown in FIG. 1 performs a TS packetizing process, wherein a part of the PES is inserted into a TS packet payload, and a TS packet header is added to the TS packet payload.

In the apparatus 100, it is assumed that a PES is multiplexed to a TS packet, but in a program stream-based transceiving system, a program stream packetizing process, wherein a program stream packet is generated by inserting a PES into a program stream packet payload, and then adding a header to the program stream packet payload, may be performed. Accordingly, when 3D image reproduction information is inserted in a PES by the apparatus 100 according to the current exemplary embodiment, the 3D image reproduction information may be read not only by a TS-based receiving terminal, but also by a program stream-based receiving terminal.

FIG. 22 illustrates 3D image basic information inserted into an extension field area of a PES, according to an exemplary embodiment.

As described above, in syntax of the 3D image basic information from among 3D image reproduction information, 3D start information (syntax 1910), 3D image format information (syntax 1420), left and right arrangement information (syntax 1430), full resolution information (syntax 1440), an indicator indicating whether spatial interval 3D reproduction information is defined (syntax 710), an indicator whether temporal interval 3D reproduction information is defined (syntax 610), the spatial interval 3D reproduction information (syntax 720 and 730), and the temporal interval 3D reproduction information (syntax 620 and 630) may be proclaimed.

In case the PES extension field data area 2146 does not have enough space to store the entire 3D image reproduction information, information essentially required and information related to interval 3D reproduction may be stored in the PES private data area 2142 that is read before the PES extension field data area 2146.

The 3D image basic information may be inserted into the PES private data area 2142 and a remaining space may be padded with '0' bits.

FIG. 23 illustrates 3D image additional information inserted into an extension field area of a PES, according to an exemplary embodiment.

In case the PES extension field data area 2146 does not have enough space to store the entire 3D image reproduction information, 3D image basic information may be stored in the PES private data area 2142, and the 3D image additional information may be stored in the PES extension field data area 2146.

The 3D image additional information includes the remaining 3D image reproduction information and 3D start information. Accordingly, in syntax of the 3D image additional information, the 3D start information (syntax 1910), an indicator indicating whether 3D camera information is changed (syntax 810), an indicator whether low fatigue information is changed (syntax 910), an indicator whether left and right imbalance information is defined (syntax 1110), 3D camera information (syntax 820 and 830), low fatigue information (syntax 920 and 930), and left and right imbalance information (syntax 1220 and 1230) may be proclaimed.

Figure 24:
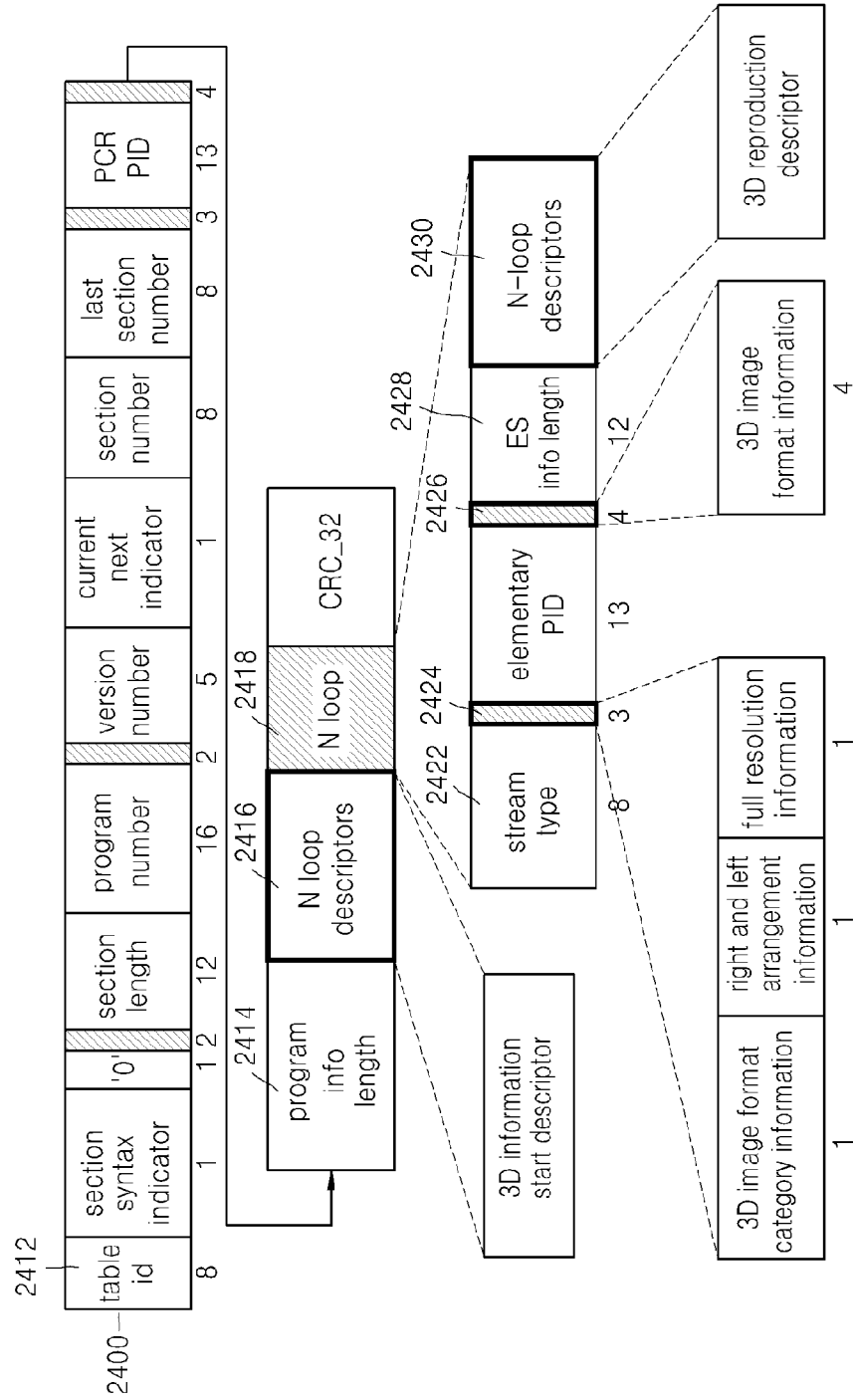
FIG. 24 is a diagram of a data structure, wherein 3D image reproduction information is inserted into a program map table section, according to an exemplary embodiment.

FIG. 24 is a diagram of a data structure, wherein 3D image reproduction information is inserted into a PMT section 2400, according to an exemplary embodiment.

According to an exemplary embodiment, the apparatus 100, as shown in FIG. 1, inserts the 3D image reproduction information into the PMT section 2400, and the apparatus 200, as shown in FIG. 2, extracts the 3D image reproduction information from the PMT section 2400.

The PMT section 2400 may include an N loop area 2418, and the 3D image reproduction information may be inserted into reserved areas 2424 and 2426 of the N loop area 2418. However, spaces of the reserved areas 2424 and 2426 are not sufficient to store the 3D image reproduction information. Accordingly, only 3D image essential information from among the 3D image reproduction information is inserted into the reserved areas 2424 and 2426.

For example, 3D start information that notifies starting of the 3D image reproduction information is inserted into an N loop descriptor area 2416, in a descriptor form. 3D image format category information, left and right arrangement information, and full resolution information may be inserted into the reserved area 2424, and 3D image format information according to the 3D image format category information may be inserted into the reserved area 2426. Also, remaining additional information of the 3D image reproduction information may be inserted into an N loop descriptor area 2430 in a 3D reproduction descriptor form. The 3D reproduction descriptor will be described later with reference to FIGS. 27 through 31.

Various types of information of the PMT section 2400 may be set as follows for a data stream structure for inserting the 3D image reproduction information into the PMT section 2400.

(i) Program information length information 2414 has the same size as a 3D information start descriptor.

(ii) 3D information start descriptor is inserted into the N loop descriptor area 2416.

(iii) Stream type information is set to a value suitable for a corresponding encoder/decoder.

(iv) The reserved area 2424 after the stream type information is three (3) bytes, and thus the 3D image format category information, the left and right arrangement information, and the full resolution information are set in an order.

(v) An elementary PID is set to indicate a PID of a corresponding stream, and the 3D image format information is inserted into the reserved area 2426.

(vi) ES information length information is set to a length of a 3D reproduction descriptor including additional information of the 3D image reproduction information.

(iv) The additional information from among the 3D image reproduction information is inserted into the N loop descriptor area 2430 as a descriptor form.

FIG. 25 is a table showing 3D image formats according to 3D image format category information, according to an exemplary embodiment.

In the apparatuses 100 and 200, as shown in FIGS. 1 and 2, respectively, according to an exemplary embodiment, 3D image format category information (3d_format_category) classifies a 3D image format according to a category. A first category is when the 3D image format has an ES structure, and a second category is when the 3D image format has a multiple ES structure.

In other words, the first category is when the 3D image format category information has a value of '0' ('3d_format_category=0'), and includes 3D image formats, wherein both of a left view image and a right view image are included in one ES. Also, the second category is when the 3D image format category information has a value of '1' ('3d_format_category=1'), and includes 3D image formats, wherein a different view image is included in each of a plurality of ESs.

For example, a 3D image format in the first category includes a side by side format, a top and bottom format, a vertical line interleaved format, a horizontal line interleaved format, a checker board format, a frame sequential format, a field sequential format, and a 2D image format.

A 3D image format in the second category includes a first view image in a multiple stream type format and a second view image in a multiple stream type format.

Accordingly, 3D image format information ('3d_format_type') may be defined according to the 3D image format category information. For example, even when a value of the 3D image format information ('3d_format_type') is '0000', the 3D image format is a side by side format when the 3D image format category information ('3d_format category') is '0', and the 3D image format is a first view image in a multiple stream type format when the 3D image format category information ('3d_format category') is '1'.

When a value of the 3D image format category information ('3d_format_category') is '1' and a value of the 3D image format information ('3d_format_type') is '0111', the content of an ES is 2D video. Accordingly, here, a decoding terminal may not read the 3D image reproduction information.

Figure 26:
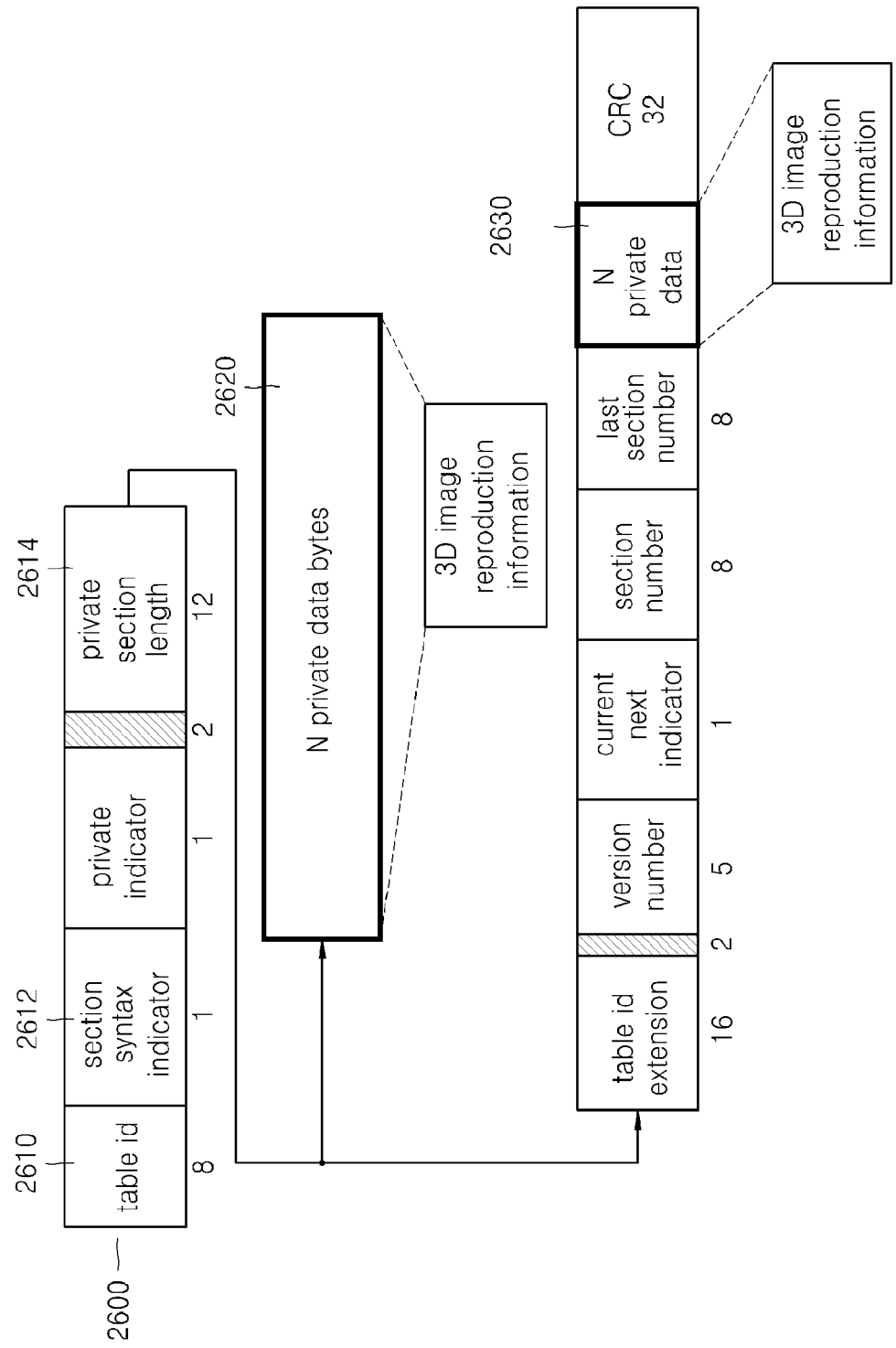
FIG. 26 is a diagram illustrating a data structure, wherein 3D image reproduction information is inserted into a private section, according to an exemplary embodiment.

FIG. 26 is a diagram illustrating a data structure, wherein 3D image reproduction information is inserted into a private section area generated by the section generator 130 of the apparatus 100 as shown in FIG. 1, according to an exemplary embodiment.

According to another exemplary embodiment, the apparatus 100 inserts the 3D image reproduction information into the private section, and the apparatus 200 as shown in FIG. 2 inserts the 3D image reproduction information into the private section.

Sections includes a PAT section (program_association_section), a CAT section (conditional_access_section), a PMT section (TS_program_map_section), and a TS description section (TS_description_section). Besides the above, the sections also include a private section area that may be used by a user A table ID may be set according to each section so as to identify sections from each other. A section including 3D image reproduction information may be inserted into a private data area. When a predetermined value is assigned to a table ID of the section including 3D image reproduction information, a decoding system of a 2D image checks the table ID of the section, and may ignore the section including the 3D image reproduction information. Alternatively, the apparatus 200 may check the table ID of the section, and when a private section including the 3D image reproduction information exists, the apparatus 200 may read the 3D image reproduction information.

According to a section syntax indicator, there may be two areas for inserting the 3D image reproduction information.

In other words, when a value of the section syntax indicator is '0', a first N private data byte area 2620 is located right after private section length information 2614, and the 3D image reproduction information may be inserted into the first N private data byte area 2620.

Alternatively, when a value of the section syntax indicator is '1', a second N private data byte area 2630 is located after generic section syntax following the private section length information, and the 3D image reproduction information may be inserted into the second N private data byte area 2630.

The private section may be set as the first N private data byte area 2620 or the second N private data byte area 2630. Here, various types of information of a section 2600 may be set as follows, for a data stream structure for inserting the 3D image reproduction information into the first N private data byte area 2620 from among private sections.

(i) First, a private section is generated as the section 2600.

(ii) Table ID information 2610 is set to a predetermined value for defining the 3D image reproduction information.

(iii) The private section length information 2614 is set considering a size of data thereafter.

(iv) 3D start information and the 3D image reproduction information may be inserted into the first N private data byte area 2620.

3D image reproduction information inserted into a descriptor area according to another exemplary embodiment of the apparatus 100, as shown in FIG. 1, will now be described with reference to FIGS. 27 through 31. Similarly, the apparatus 200, as shown in FIG. 2, may extract the 3D image reproduction information from the descriptor area.

The descriptor area is used to define a program and a program element. All descriptors start with descriptor tag (descriptor_tag) and descriptor length (descriptor_length) information. A descriptor type is identified according to a descriptor tag, and some descriptor tags may be assigned to a private area that may be used by a user. A descriptor area may be assigned to a PMT section, or assigned to a separate descriptor section.

In the apparatuses 100 and 200 according to the current exemplary embodiment, a part of a private area may be used for a 3D reproduction descriptor.

The 3D reproduction descriptor may divide 3D image reproduction information into five (5) pieces, thereby amending or dividing each 3D reproduction descriptor format according to a system specification or use environment. Five (5) descriptors of the 3D reproduction descriptor are a 3D information start descriptor for 3D start information, a 3D camera descriptor for 3D camera information, a low fatigue descriptor for low fatigue information, an interval 3D reproduction descriptor for spatial interval 3D reproduction information and temporal interval 3D reproduction information, and a left and right imbalance descriptor for left and right imbalance information.

FIG. 27 is a table showing a 3D information start descriptor (3d_start_descriptor) 2700 inserted into a descriptor area, according to an exemplary embodiment.

The 3D information start descriptor 2700 includes a descriptor tag 2710, descriptor length information 2720, and 3D start information 2730 that are described with reference to FIG. 19. Since the 3D information start descriptor 2700 is located in an area that is first parsed or read, a decoding terminal may first determine that 3D reproduction descriptors exist in a corresponding section. As described above, the 3D start information 2730 may be set as a hexa-code '0x03444946' or an ASCII code '3DIF'.

FIG. 28 is a table showing a 3D camera descriptor (3d_camera_descriptor) 2800 inserted into a descriptor area, according to an exemplary embodiment.

The 3D camera descriptor 2800 includes the descriptor tag 2710, the descriptor length information 2720, and 3D camera information 2810 that are described with reference to FIG. 8.

FIG. 29 is a table showing a low fatigue descriptor (3d_safety_descriptor) 2900 inserted into a descriptor area, according to an exemplary embodiment.

The low fatigue descriptor 2900 includes the descriptor tag 2710, the descriptor length information 2720, and low fatigue information 2910 that are described with reference to FIG. 9.

FIG. 30 is a table showing an interval 3D descriptor (local_3d_descriptor) 3000 inserted into a descriptor area, according to an exemplary embodiment.

The interval 3D descriptor 3000 includes the descriptor tag 2710, the descriptor length information 2720, and interval 3D reproduction information 3010, including spatial interval 3D reproduction information and temporal interval 3D reproduction information, that are described with reference to FIG. 6.

Figures 31, 32:
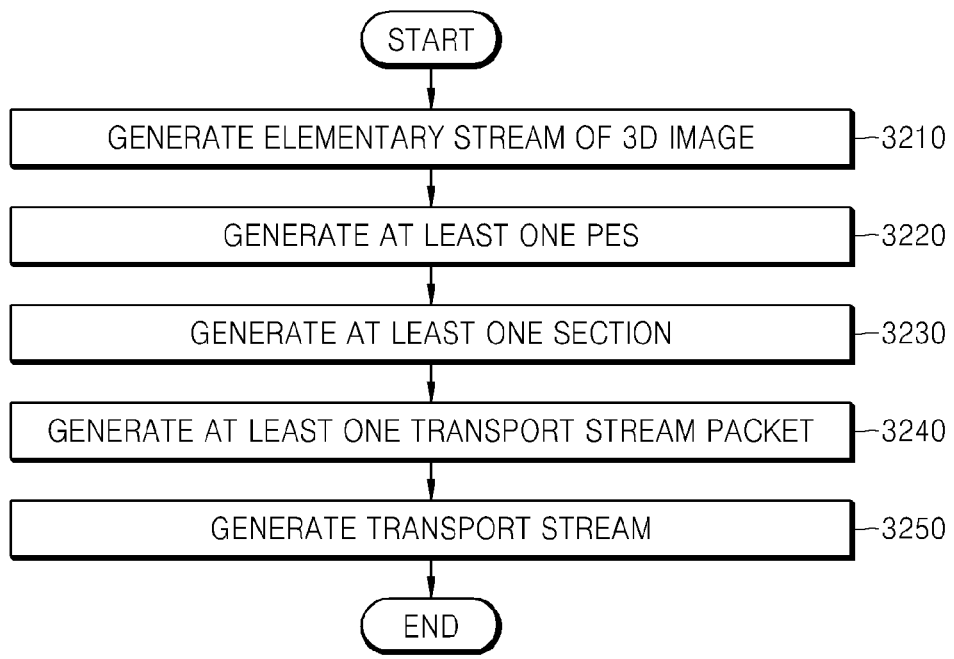
FIG. 31 is a table showing a left and right imbalance descriptor inserted into a descriptor area, according to an exemplary embodiment.
FIG. 32 is a flowchart illustrating a method of transmitting 3D image data stream, according to an exemplary embodiment.

FIG. 31 is a table showing a left and right imbalance descriptor (imbalance_descriptor) 3100 inserted into a descriptor area, according to an exemplary embodiment.

The left and right imbalance descriptor 3100 includes the descriptor tag 2710, the descriptor length information 2720, and left and right imbalance information 3110 that are described with reference to FIG. 12.

FIG. 32 is a flowchart illustrating a method of transmitting 3D image data stream, according to an exemplary embodiment.

In operation 3210, an ES including an encoded bit string of a 3D image is generated. In the 3D image, a 3D image or a 2D image may be mixed together. In a 3D image format, a left view image and a right view image may be included in one frame, or different view images may be arranged in different frames. Alternatively, different view images may be formed in different ESs.

In operation 3220, the ES is packetized, and thus at least one PES is generated. The PES may include a header area and a payload area, and 3D image reproduction information may be inserted into the header area. Here, the 3D image reproduction information may be inserted into an extension field area of the header area of the PES.

In operation 3230, at least one section is generated by multiplexing program related information of the 3D image. The at least one section may include a PAT section, a PMT section, a CAT section, a description section, and a private section. 3D image reproduction information may be inserted into the PMT section or the private section of the at least one section.

In operation 3240, at least one TS packet is generated for each of the at least one section and the at least one PES. The TS packet has 188 bytes, including four (4) bytes of a header area and 184 bytes of a payload area. 3D image reproduction information may be inserted into an adaptation field area, an adaptation field extension area, or the like of the header area.

In other words, 3D image reproduction information required to reproduce a 3D image is inserted into at least one of the PES, the TS packet, and the section. The 3D image reproduction information includes information about a 3D image format, information about an arrangement order of a left view image and a right view image, information about whether a left view image and a right view image forms a 3D image while maintaining the full resolution, information about an image for spatial interval 3D reproduction, information about an image for temporal interval 3D reproduction, information about a 3D camera system, information required for low fatigue operation, and information about an imbalance model of a left view image and a right view image.

In operation 3250, a TS is generated by multiplexing the generated TS packet.

According to an exemplary embodiment, in a TS-based system, an ES may be multiplexed into a TS by packetizing the ES, but in a program stream-based system, an ES may be multiplexed into a program stream by packetizing the ES.

In a TS system according to a predetermined image communication standard, 3D image reproduction information may be inserted into a space pre-assigned to a PES, a TS packet, and/or a section. Accordingly, the method of FIG. 32 may be applied to a TS system according to a related art image communication standard, without changing the TS system. Also, the 3D image reproduction information may be provided without additionally assigning a transport channel or an information storage space.

Figure 33:
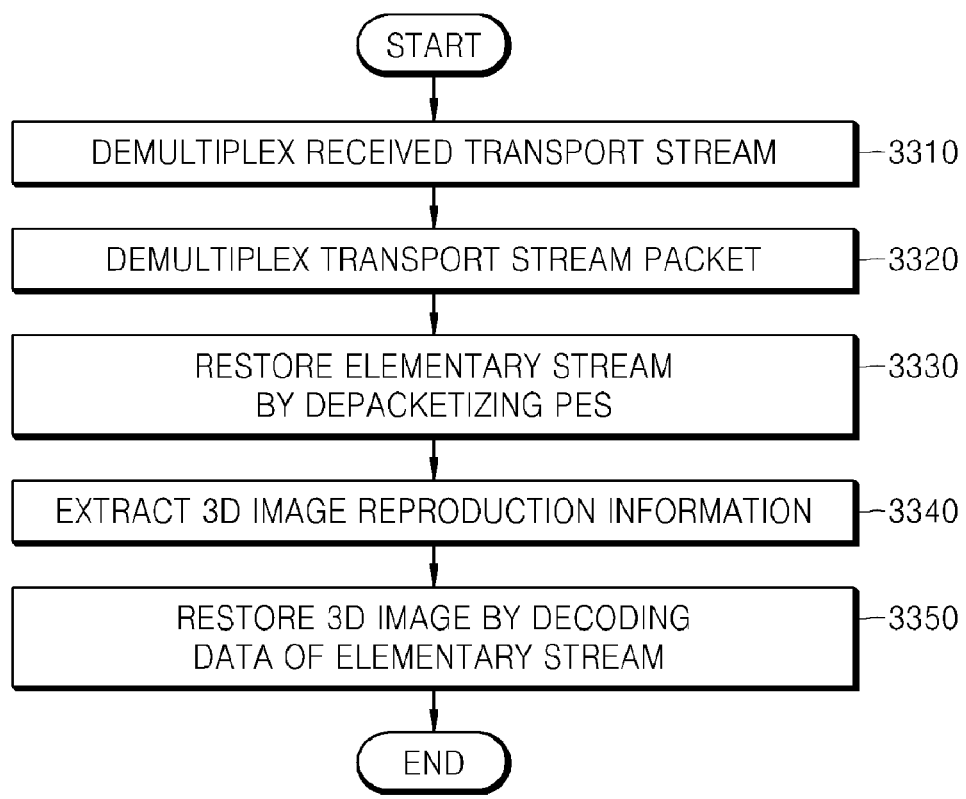
FIG. 33 is a flowchart illustrating a method of receiving 3D image data stream, according to an exemplary embodiment.

FIG. 33 is a flowchart illustrating a method of receiving 3D image data stream, according to an exemplary embodiment. In a TS-based system, a TS is received and demultiplexed into an ES, whereas in a program stream-based system, a program stream is received and demultiplexed into an ES.

In operation 3310, a received TS is demultiplexed, and thus separated into at least one TS packet. The TS is demultiplexed into a TS packet having 188 bytes.

In operation 3320, the at least one TS packet is depacketized, and thus restored into at least one PES and at least one section.

In operation 3330, 3D image reproduction information required for reproducing a 3D image is extracted from any one of the at least one TS packet, the at least one PES, and the at least one section.

The 3D image reproduction information may be extracted from an adaptation field area or an adaptation field extension area of a header area of the TS packet. Alternatively, the 3D image reproduction information may be extracted from an extension field area of the PES. Alternatively, the 3D image reproduction information may be extracted from a PMT section or a private section of the section.

In operation 3340, an ES is restored by depacketizing the at least one PES.

In operation 3350, a 3D image is restored by decoding data of the ES. The restored 3D image may be reproduced by using a 3D reproduction method using the extracted 3D image reproduction information.

The 3D image reproduction information recognizable by a 3D reproduction system is extracted by using the method, and thus a 3D content broadcasting service, which guarantees a 3D effect and low viewing fatigue, is provided. Also, since the method has a related art data structure used in a related art 2D image system, the method may also be used in the related art 2D image system.

The exemplary embodiments can be written as computer programs and can be implemented in general-use digital computers that execute the programs using a computer readable recording medium. Examples of the computer readable recording medium include storage media including magnetic storage media (e.g., ROM, floppy disks, hard disks, etc.) and optical recording media (e.g., CD-ROMs, or DVDs).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of generating a three-dimensional (3D) image data stream, the method comprising:
    generating an elementary stream (ES) comprising an encoded bit string of a 3D image;
    generating at least one packetized ES (PES) by packetizing the ES;
    generating sections by multiplexing program related information about the 3D image, wherein the sections comprise a program association table (PAT) section and a program map table (PMT) section;
    generating at least one transport stream (TS) packet for the sections and the at least one PES; and
    generating a TS by multiplexing the generated TS packet, wherein 3D image reproduction information that is required to reproduce the 3D image is inserted into a reserved section for private use from among the sections, and
    wherein the PAT section, the PMT section, and the reserved section have different table identifiers.

2. The method of claim 1, further comprising transmitting the transport stream.

3. The method of claim 1, wherein the 3D image reproduction information comprises information on characteristics of the 3D image.

4. The method of claim 1, wherein the 3D image reproduction information is stored in an established area in at least one of the at least one PES, the at least one TS packet, and the sections section.

5. The method of claim 1, wherein the generating the TS packet comprises inserting the 3D image reproduction information into an adaptation field of a predetermined TS packet from among the at least one TS packet.

6. The method of claim 5, wherein in the inserting the 3D image reproduction information, the 3D image reproduction information is inserted into a private data byte area of the adaptation field area.

7. The method of claim 6, wherein indicator information, which indicates whether the 3D image reproduction information is defined, is inserted into a reserved area of an adaptation field extension area of the adaptation field area.

8. The method of claim 5, wherein in the inserting the 3D image reproduction information, the 3D image reproduction information is inserted into a reserved area of an adaptation field extension area of the adaptation field area.

9. The method of claim 1, wherein the generating the PES comprises inserting the 3D image reproduction information into an extension field area of a predetermined PES from among the at least one PES.

10. The method of claim 9, wherein in the inserting the 3D image reproduction information, the 3D image reproduction information is inserted into at least one of a private data area of the extension field area and another data area of the extension field area.

11. The method of claim 10, wherein information indicating starting of the 3D image reproduction information, 3D image format information, left and right arrangement information, full resolution information, temporal interval 3D reproduction information, and spatial interval 3D reproduction information from among the 3D image reproduction information are inserted into the private data area, and remaining information from among the 3D image reproduction information is inserted into the other data area of the extension field area.

12. The method of claim 1, wherein the generating the TS packet comprises inserting the 3D image reproduction information into the program map table (PMT) section from among sections.

13. The method of claim 12, wherein in the inserting the 3D image reproduction information, left and right arrangement information from among 3D image reproduction information is inserted into a reserved area of a stream type information area of the PMT section, and 3D image format information from among the 3D image reproduction information is inserted into a reserved area of an elementary packet identifier (PID) information area of the PMT section.

14. The method of claim 13, wherein in the inserting the 3D image reproduction information, full resolution information, which indicates resolution of a right view image and a left view image forming the 3D image, from among the 3D image reproduction information is inserted into the reserved area of the stream type information area.

15. The method of claim 13, wherein the 3D image format information is classified based on whether the 3D image has a format according to a plurality of ESs.

16. The method of claim 13, wherein in the inserting the 3D image reproduction information, information excluding the 3D image format information, the left and right arrangement information, and the full resolution information from among the 3D image reproduction information is inserted into a loop descriptor area of the PMT section.

17. The method of claim 1, wherein the generating the TS packet comprises:
    generating the reserved section from among the section; and
    inserting the 3D image reproduction information into the reserved section.

18. The method of claim 17, wherein in the inserting the 3D image reproduction information, the 3D image reproduction information is inserted into a private data byte area of the reserved section.

19. The method of claim 1, wherein the generating the TS packet comprises:
generating at least one 3D reproduction descriptor comprising the 3D image reproduction information; and
inserting the at least one 3D reproduction descriptor into a descriptor area of the program map table (PMT) section of the sections.

20. The method of claim 19, wherein the 3D reproduction descriptor comprises a 3D information start descriptor indicating that the 3D reproduction descriptor exists.

21. The method of claim 20, wherein the 3D reproduction descriptor comprises at least one of a 3D camera descriptor, a low fatigue descriptor, an interval 3D reproduction descriptor, and a left and right imbalance descriptor.

22. The method of claim 1, wherein the 3D image reproduction information comprises 3D start information indicating starting of the 3D image reproduction information.

23. The method of claim 1, wherein the 3D image reproduction information comprises essential information comprising 3D image format information, which indicates formats of a left view image and a right view image of the 3D image, left and right arrangement information, which indicates an arrangement order of the left view image and the right view image, and full resolution information, which indicates resolution of the left view image and the right view image forming the 3D image.

24. The method of claim 23, wherein the 3D image reproduction information further comprises additional information, which is required for reproduction of the 3D image.

25. The method of claim 24, wherein the additional information comprises at least one of interval 3D reproduction information that indicates temporal interval or spatial interval that is reproduced in 3D from among entire image data, 3D camera information that is about cameras that obtained the 3D image, low fatigue information that lessens viewing awkwardness generated while reproducing the 3D image, and left and right imbalance information that indicates an imbalance state of the left view image and the right view image.

26. The method of claim 25, wherein the left and right imbalance information is expressed by using one of an offset between a left view image pixel value and a right view image pixel value, a linear function between the left view image pixel value and the right view image pixel value, and a lookup table between the left view image pixel value and the right view image pixel value.

27. The method of claim 25, wherein the additional information comprises indicator information that indicates whether the additional information is defined.

28. A computer readable recording medium having recorded thereon a program for executing the method of claim 1.

29. A method of receiving a three-dimensional (3D) image data stream, the method comprising:
separating at least one transport stream (TS) packet by demultiplexing a received TS;
restoring at least one packetized elementary stream (PES) and sections comprising a program association table (PAT) section and a program map table (PMT) section by depacketizing the at least one TS packet;
restoring an elementary stream (ES) by depacketizing the at least one PES;
extracting 3D image reproduction information that is required to reproduce a 3D image from a reserved section for private use from among the sections; and
restoring the 3D image by decoding data of the ES,
wherein the PAT section, the PMT section and the reserved section have different table identifiers.

30. The method of claim 29, further comprising reproducing the restored 3D image by using the 3D image reproduction information.

31. The method of claim 29, wherein the extracting the 3D image reproduction information comprises extracting the 3D image reproduction information from an established area in at least one of the at least one PES, the at least one TS packet, and the sections.

32. The method of claim 29, wherein the extracting the 3D image reproduction information comprises extracting the 3D image reproduction information from an adaptation field area of a predetermined TS packet from among at least one TS packet.

33. The method of claim 32, wherein the extracting the 3D image reproduction information comprises extracting the 3D image reproduction information from a private data byte area of the adaptation field area.

34. The method of claim 33, wherein in the extracting the 3D image reproduction information, indicator information, which indicates whether the 3D image reproduction information is defined, from among the 3D image reproduction information is extracted from a reserved area of an adaptation field extension area of the adaptation field area.

35. The method of claim 33, wherein in the extracting the 3D image reproduction information, the 3D image reproduction information is extracted from a reserved area of an adaptation field extension area of the adaptation field area.

36. The method of claim 29, wherein the extracting the 3D image reproduction information comprises extracting the 3D image reproduction information from an extension field of a predetermined PES from among the at least one PES.

37. The method of claim 36, wherein in the extracting the 3D image reproduction information, the 3D image reproduction information is extracted from at least one of a private data area of the extension field area and another data area of the extension field area.

38. The method of claim 37, wherein information indicating starting of the 3D image reproduction information, 3D image format information, left and right arrangement information, full resolution information, temporal interval 3D reproduction information, and spatial interval 3D reproduction information from among the 3D image reproduction information are extracted from the second reserved area of the private data area, and remaining information from among the 3D image reproduction information is extracted from the other data area of the extension field area.

39. The method of claim 29, wherein the extracting the 3D image reproduction information comprises extracting the 3D image reproduction information from the program map table (PMT) section from among the sections.

40. The method of claim 39, wherein in the extracting of the 3D image reproduction information, left and right arrangement information from among the 3D image reproduction information is extracted from a reserved area of a stream type information area of the PMT section, and 3D image format information from among the 3D image reproduction information is extracted from a reserved area of an elementary packet identifier (PID) information area of the PMT section.

41. The method of claim 40, wherein in the extracting the 3D image reproduction information, full resolution information, which indicates resolution of a left view image and a right view image forming the 3D image, from among the 3D image reproduction information is extracted from the reserved area of the stream type information area.

42. The method of claim 40, wherein in the extracting of the 3D image reproduction information, the 3D image format information is classified based on whether the 3D image has a format according to a plurality of ESs.

43. The method of claim 40, wherein in the extracting the 3D image reproduction information, information excluding the 3D image format information, the left and right arrangement information, and the full resolution information from among the 3D image reproduction information is extracted from a loop descriptor area of the PMT section.

44. The method of claim 29, wherein the extracting the 3D image reproduction information comprises extracting the 3D image reproduction information from the reserved section from the sections.

45. The method of claim 44, wherein in the extracting the 3D image reproduction information, the 3D image reproduction information is extracted from a private data byte area of the reserved section.

46. The method of claim 29, wherein the extracting the 3D image reproduction information comprises extracting at least one 3D reproduction descriptor comprising the 3D image reproduction information, from a descriptor area of the program map table (PMT) section of the sections.

47. The method of claim 46, wherein the 3D reproduction descriptor comprises a 3D start descriptor indicating that the 3D reproduction descriptor exists.

48. The method of claim 46, wherein the 3D reproduction descriptor further comprises at least one of a 3D camera descriptor, a low fatigue descriptor, an interval 3D reproduction descriptor, and a left and right imbalance descriptor.

49. The method of claim 29, wherein in the extracting the 3D image reproduction information, 3D start information, which indicates starting of the 3D image reproduction information, is extracted from the 3D image reproduction information, and the 3D image reproduction information is extracted based on the 3D start information.

50. The method of claim 29, wherein the extracting of the 3D image reproduction information comprises essential information comprising 3D image format information, which indicates formats of a left view image and a right view image of the 3D image, left and right arrangement information, which indicates an arrangement order of the left view image and the right view image, and full resolution information, which indicates resolution of the left view image and the right view image forming the 3D image.

51. The method of claim 50, wherein the extracting the 3D image reproduction information further comprises extracting additional information, which is required to reproduce the 3D image, from the 3D image reproduction information.

52. The method of claim 51, wherein the additional information comprises at least one of interval 3D reproduction information that indicates temporal interval or spatial interval that is reproduced in 3D from among entire image data, 3D camera information that is about cameras that obtained the 3D image, low fatigue information that lessens viewing awkwardness generated while reproducing the 3D image, and left and right imbalance information that indicates an imbalance state of the left view image and the right view image.

53. The method of claim 52, wherein the left and right imbalance information is expressed by using one of an offset between a left view image pixel value and a right view image pixel value, a linear function between the left view image pixel value and the right view image pixel value, and a look-up table between the left view image pixel value and the right view image pixel value.

54. The method of claim 52, wherein the additional information comprises indicator information that indicates whether the additional information is defined.

55. A computer readable recording medium having recorded thereon a program for executing the method of claim 29.

56. An apparatus for generating a three-dimensional (3D) image data stream, the apparatus comprising:
an elementary stream (ES) generator which generates an ES comprising an encoded bit string of a 3D image;
a packetized elementary stream (PES) generator which generates at least one PES by packetizing the ES;
a section generator which generates sections comprising a program association table (PAT) section and a program map table (PMT) section by multiplexing program related information of the 3D image;
a transport stream (TS) packet generator which generates at least one TS packet for the sections and at least one PES; and
a TS generator which generates a TS by multiplexing the generated TS packet,
wherein 3D image reproduction information, which is required to reproduce the 3D image, is inserted into a reserved section for private use from among the sections, and
wherein the PAT section, the PMT section, and the reserved section have different table identifiers.

57. The apparatus of claim 56, further comprising a TS transmitter which transmits the TS.

58. An apparatus for receiving a three-dimensional (3D) image data stream, the apparatus comprising:
a transport stream (TS) demultiplexer which separates at least one transport packet by demultiplexing a received TS;
a TS packet depacketizer which restores at least one packetized elementary stream (PES) and sections comprising a program association table (PAT) section and a program map table (PMT) section by depacketizing the at least one TS packet;
a PES depacketizer which restores an elementary stream (ES) by depacketizing the at least one PES;
a 3D image reproduction information extractor which extracts 3D image reproduction information required to reproduce a 3D image, from a reserved section for private use from among the sections; and
a 3D image restorer which restores the 3D image by decoding data of the ES,
wherein the PAT section, the PMT section, and the reserved section have different table identifiers.

59. The apparatus of claim 58, further comprising a 3D image reproducer which reproduces the restored 3D image by using the 3D image reproduction information.

60. A method of generating a three-dimensional (3D) image data stream, the method comprising:
generating at least one of a packetized elementary stream (PES) comprising at least one of video data and audio data of a 3D image, and sections comprising program related information about the 3D image that comprise a program association table (PAT) section and a program map table (PMT) section; and
generating a transport stream (TS) packet including the at least one of the PES and the sections;

wherein information on characteristics of the 3D image is inserted into a reserved section for private use from among the sections, wherein the PAT section, the PMT section and the reserved section have different table identifiers.

61. A method of receiving a three-dimensional (3D) image data stream, the method comprising:

demultiplexing a transport stream (TS) to produce a TS packet;

restoring at least one of a packetized elementary stream (PES) comprising at least one of video data and audio data of a 3D image, and sections including program related information about the 3D image, which comprise a program association table (PAT) section and a program map table (PMT) section by depacketizing the TS packet;

restoring an elementary stream (ES) by depacketizing the PES; and extracting information on characteristics of the 3D image, wherein the information on the characteristics of the 3D image is inserted into a reserved section for private use from among the sections, and wherein the PAT section, the PMT section and the reserved section have different table identifiers.

* * * * *